Aug. 29, 1967 A. W. KYLLONEN 3,338,355
TREAD BRAKE UNIT AND SLACK ADJUSTER THEREFOR
Filed July 6, 1965 4 Sheets-Sheet 1
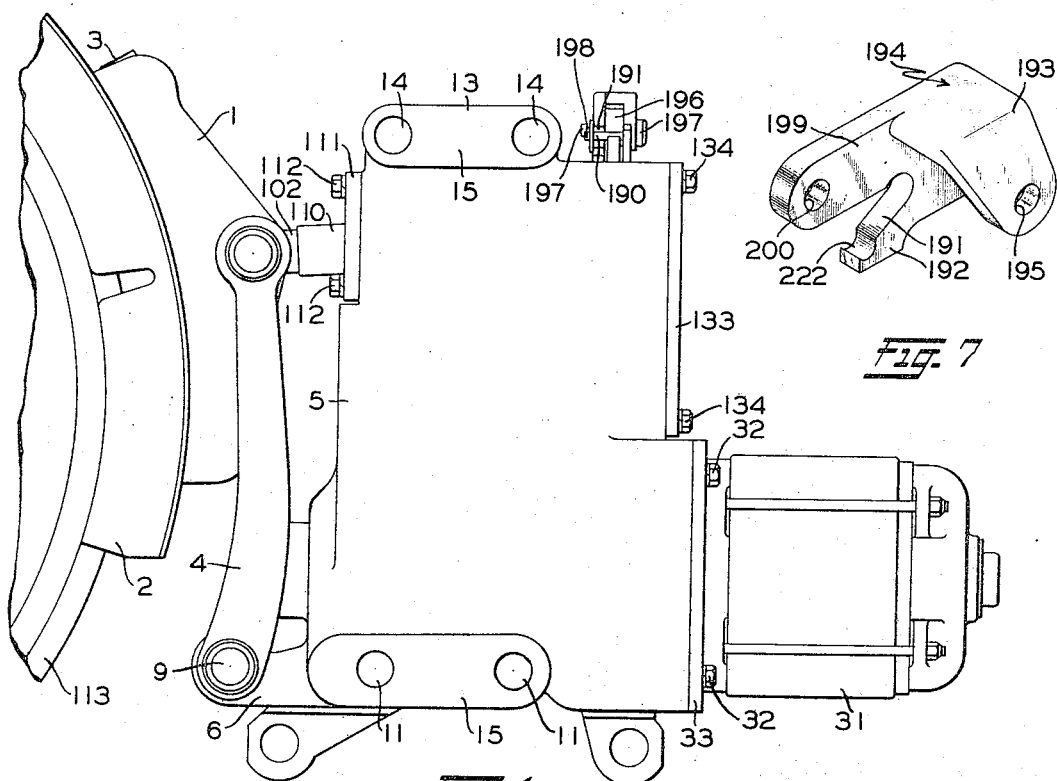
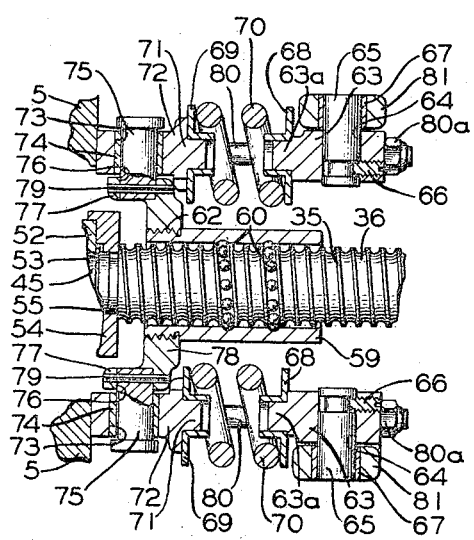
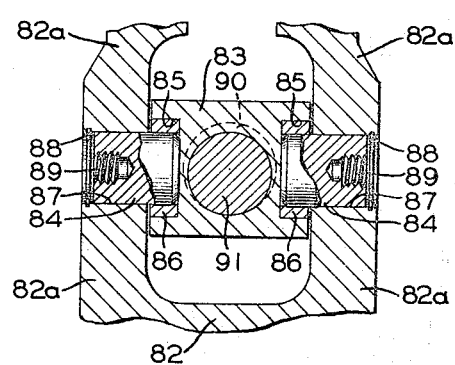
INVENTOR.
Allen W. Kyllonen
BY
A. A. Steinmiller
Attorney

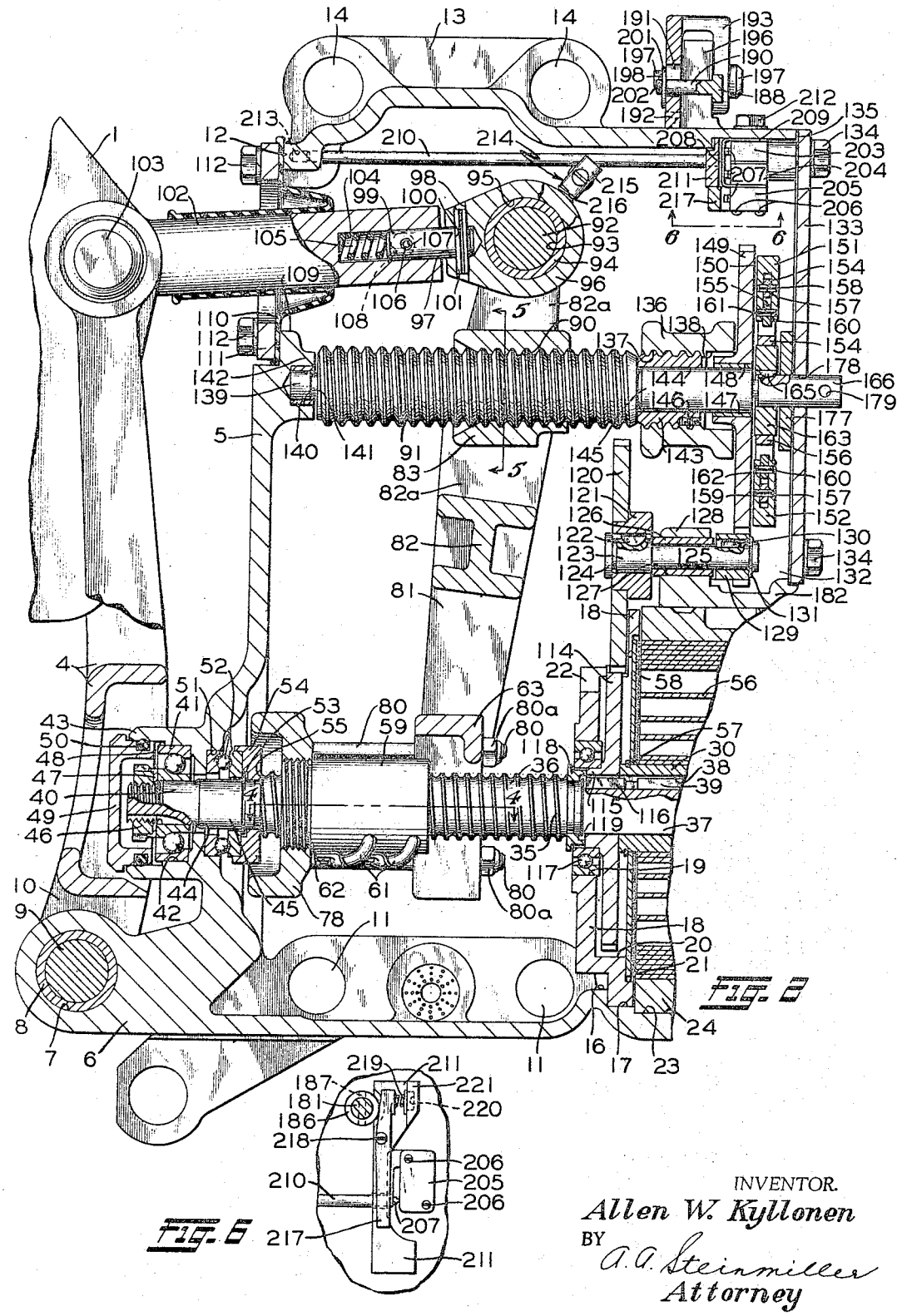

INVENTOR.
Allen W. Kyllonen

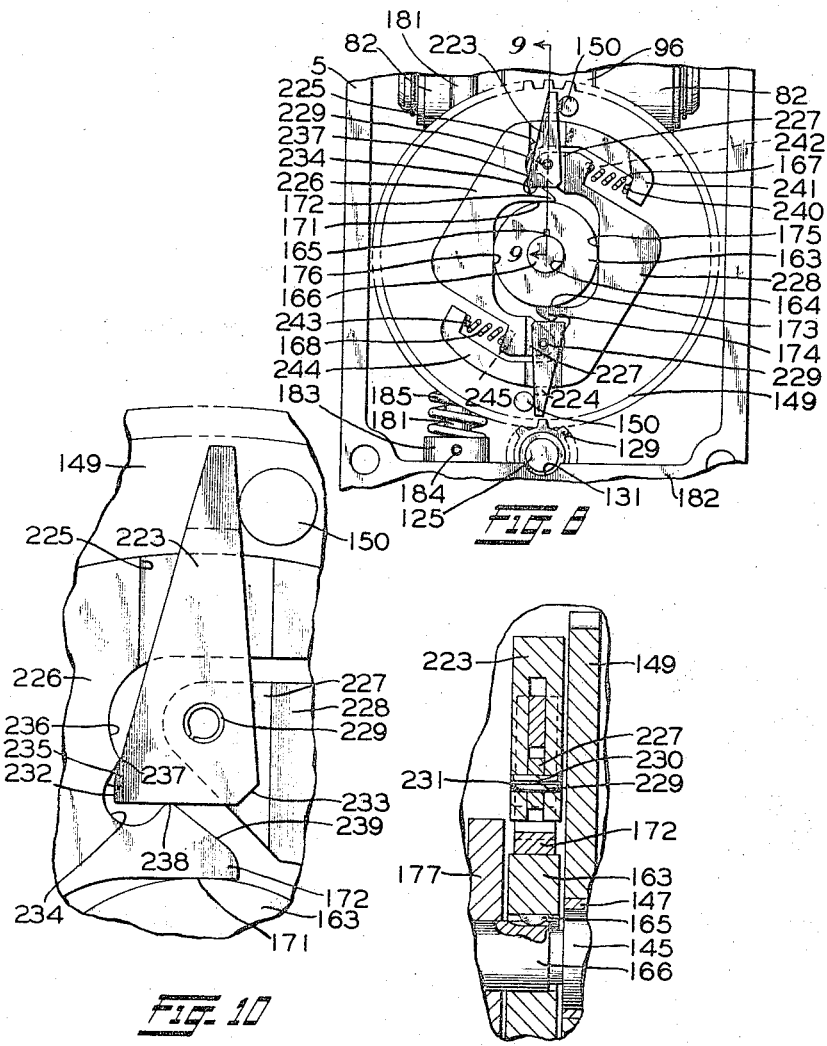

3,338,355
TREAD BRAKE UNIT AND SLACK ADJUSTER THEREFOR
Allen W. Kyllonen, Pittsburgh, Pa., assignor to Westinghouse Air Brake Company, Wilmerding, Pa., a corporation of Pennsylvania
Filed July 6, 1965, Ser. No. 469,432
18 Claims. (Cl. 188—202)

ABSTRACT OF THE DISCLOSURE

The present invention comprises a tread brake unit for railway car trucks of the type having a power-operated brake shoe actuating lever wherein the brake shoe is biased to remain constantly in light pressure contact with the tread surface of a corresponding wheel during brake release and characterized in that the actuating lever is pivoted on a fulcum member that is shifted automatically by a slack adjusting means upon wear of the brake shoe so as to maintain normal light pressure contact of the brake shoe with the tread surface of the wheel during brake release.

---

In Patent 3,280,944 issued Oct. 25, 1966, to Allen W. Kyllonen and assigned to the assignee of the present application, there is shown a spring-applied power-released package tread brake assembly that comprises an electrical torque motor which is connected to the opposite ends of a spiral spring through a planetary gear unit and to a screw on which is mounted a traveling nut having a yieldable connection with one end of a brake lever pivotally mounted at its opposite end and operatively connected intermediate its ends to an external hanger mounted brake-shoe-carrying brake head by means of a brake shoe adjusting rod pivotally connected at one end to the brake lever and at its opposite end to the brake head and to the external brake head hanger. This spring-applied power-released package brake assembly has embodied therein, between the brake lever and the brake shoe adjusting rod and carried on this rod, a slack adjuster mechanism which is fully described in copending United States application Ser. No. 322,103 of George K. Newell, filed Nov. 7, 1963, and now abandoned.

As explained in detail in application Ser. No. 322,103, this slack adjuster mechanism is operative, as a brake shoe of a package brake assembly wears away, to compensate for this wear, and comprises, in addition to the brake shoe adjusting rod which is constituted by a non-rotative screw member and an internally threaded sleeve member, a driving mechanism actuated by an arm integral with the brake lever for effecting rotation of the internally threaded sleeve member on the non-rotative screw member, which driving mechanism, in response to rocking of the brake lever through an angle greater than a chosen angle, actuates a pawl whereby the pawl effects rotation of a ratchet wheel secured to the sleeve member to thereby increase the length of the brake shoe actuating rod as the brake shoe wears away, thus maintaining constant brake shoe clearance. Accordingly, while the brakes are released, the braking surface of the brake shoe of the tread brake assembly, shown and described in the above-mentioned Patent 3,280,944, is maintained a chosen distance, for example, five-eighths of an inch, away from the tread surface of the corresponding wheel. Therefore, when a brake application is effected, it is necessary that the spiral spring unwind a chosen amount to, via the spring arbor of the planetary gear unit, effect rotation of the screw a certain number of revolutions, for example, seven, in order that the traveling nut travel along the screw a sufficient distance to, through the intermediary of the brake lever, one end of which is connected to the traveling nut by the yieldable connection, and the brake shoe adjusting rod, effect movement of the brake shoe into braking contact with the tread surface of the corresponding wheel. These necessary revolutions of the screw effected by unwinding of the spiral spring before the brake shoe is brought into braking contact with the tread surface of the corresponding wheels consumes or requires a certain interval of time and also results in a reduction in the effective potential energy in the spiral spring for pressing the brake shoe against the tread surface of the corresponding wheel since unwinding of the spiral spring, as it effects rotation of the screw through, for example, seven complete revolutions, results in a corresponding reduction in the potential energy of the spiral spring.

The very high speeds and frequent stops required of vehicles operating on modern transit systems necessitate a brake assembly for such vehicles that is capable of delivering maximum braking forces substantially instantaneously. Accordingly, it is apparent that a brake assembly, of the type described above wherein several complete revolutions of its brake-applying screw are required in order to bring the brake shoe of this brake assembly into braking contact with the tread surface of its corresponding wheel, does not provide the substantially instantaneous braking response to initiation of a brake application desirable for modern high-speed transit vehicles.

Furthermore, it is apparent that the several, for example, seven, complete revolutions of the brake-applying screw required to bring the brake shoe of the above-described brake assembly into braking contact with the tread surface of the corresponding wheel effects a corresponding change in the respective angular positions of the pivotally connected brake head hanger and brake shoe adjusting rod. This change in the angular position of the brake shoe actuating rod effects a corresponding change in the position of the slack adjuster mechanism carried on this rod so that this mechanism is moved away from the slack adjuster actuating arm formed integral with the brake lever. Also, it should be apparent from the foregoing statement that if the brake assembly described above, and in the aforementioned copending application Ser. No. 322,103, be modified as by increasing the length of the brake shoe adjusting rod, through manual adjustment, to provide a minimum brake shoe clearance and thereby a corresponding reduction in the number of revolutions required of the brake-applying screw to bring the brake shoe into contact with the tread surface of the corresponding wheel, a corresponding change will be effected in the respective angular positions of the pivotally connected brake head hanger and brake shoe adjusting rod without effecting a corresponding change in the angular position of the brake lever and the slack adjuster actuating arm that is integral therewith. Since the slack adjuster mechanism is carried on the brake shoe actuating rod, the above-mentioned change in the angular position of this brake shoe actuating rod is effective to move the slack adjuster mechanism away from the slack adjuster actuating arm on the brake lever. Consequently, when the brake shoe begins to wear during a subsequently effected brake application, appreciable wear of the brake shoe must occur before the brake lever is rocked through a sufficient angle to cause the slack adjuster actuating arm integral therewith to operate the slack adjuster mechanism to compensate for brake shoe wear, unless the design of the brake lever is correspondingly changed to change the angle between the slack adjuster operating arm and the longitudinal axis of the brake lever.

It has been found that package brake assemblies are subject during winter weather to the collection thereon of ice and snow which interferes with the proper movement of the brake shoe into direct frictional contact with the tread of the wheel of a railway car truck, thereby, in some instances, interfering with a quick and full brake application when desired.

Accordingly, several schemes, methods and mechanisms have been proposed and tried on certain railroads to prevent the collection of ice and snow on brake assemblies of the package type, one of which being a so-called "snow brake" in the form of a biasing or spring means for constantly pressing a brake shoe against the tread surface of a corresponding wheel with a light force of such magnitude as to generate sufficient heat to prevent the accumulation of ice and snow thereon.

However, if a "snow brake" of the spring-biasing type is incorporated in an electrically controlled spring-applied power-released package brake assembly of the type described in the above-mentioned Patent 3,280,944, which package brake assembly includes a slack adjuster mechanism of the type described in copending application Ser. No. 322,103, in the form of a spring-biased lost-motion connection between two rod members comprising a brake shoe adjusting rod that thereby constitutes a yieldable link connecting the brake lever to the brake head hanger, the spring-biasing type of "snow brake" renders this slack adjuster mechanism unsuitable for use with the resulting brake assembly, as will now be explained.

The inclusion of a spring-biasing type of "snow brake" in a spring-applied power-released package brake assembly of the type disclosed in Patent 3,280,944 having a slack adjuster mechanism of the type disclosed in copending application Ser. No. 322,103, insures that the brake shoe of this brake assembly is constantly spring biased into contact with the tread surface of the corresponding wheel. Therefore, it is apparent that the respective angular positions of the brake head hanger and the corresponding brake shoe adjusting rod constantly change as the brake shoe wears away without effecting a corresponding change in the angular position of the brake lever (while the brakes are released), to which lever the brake shoe adjusting rod is pivotally connected since the slack adjuster mechanism is operative in response to brake shoe wear to increase the distance between the pivotal connection of the brake lever to the brake shoe adjusting rod and the pivotal connection of this rod to the brake head hanger. Since the slack adjuster mechanism, which is carried by the brake shoe adjusting rod, is actuated by the arm formed integral with the brake lever, it is further apparent that a change in the angular position of the brake shoe adjusting rod and the slack adjuster mechanism carried thereby, resulting from brake shoe wear without a corresponding change in the angular position of the brake lever and the actuating arm integral therewith, results in movement of the slack adjuster mechanism away from the actuating arm. Moreover, to insure that the slack adjuster mechanism operates in response to initial wear of a brake shoe constantly pressed into contact with the tread surface of its corresponding car wheel by a spring-biasing type of "snow brake," it would be necessary that the initial distance between the slack adjuster mechanism and the actuating arm of the brake lever be a minimum. Therefore, the above-mentioned movement of the slack adjuster mechanism away from the actuating arm that operates this mechanism as the brake shoe wears away would result in further delayed operation of the slack adjuster mechanism. It is therefore apparent that a slack adjuster mechanism of the type disclosed in the above-mentioned copending application Ser. No. 322,103 is unsuitable for use in a brake assembly such as that described in the hereinbefore-mentioned Patent 3,280,944 and which may have a spring biased "snow brake" embodied therein.

Accordingly, it is the general purpose of this invention to provide a spring-applied power-released package type tread brake assembly that may include a "snow brake" in the form of a biasing or spring means for constantly pressing a brake shoe against the tread surface of a corresponding wheel with a light force of such magnitude as to generate sufficient heat to prevent the accumulation of ice and snow thereon, and a novel slack adjuster mechanism that is operable in conjunction with the "snow brake" spring means to adjust the position of the fulcrum of a brake lever of a brake shoe actuating linkage in accordance with brake shoe wear occurring while a brake application is in effect, upon effecting a subsequent brake release whereby the brake shoe, while the brakes are released, is always pressed against the tread surface of its corresponding wheel with the same degree of force notwithstanding previous brake shoe wear.

The present invention comprises slack adjusting means for a tread brake assembly of the type disclosed in Patent 3,280,944, which brake assembly is so modified as to include a spring-biased type of "snow brake" that constitutes one link of a linkage through which a braking force, other than that exerted by the "snow brake," is transmitted to a brake shoe for forcing it into braking contact with the tread surface of the corresponding car wheel as a spiral spring unwinds.

The above-mentioned linkage comprises, in addition to the one link included in the "snow brake," a brake lever pivotally mounted on a longitudinally movable fulcrum member that constitutes a non-rotatable nut carried on a fulcrum adjusting screw member rotatable on its own axis without movement therealong by a novel slack adjuster mechanism that includes a unidirectional clutch for rotating the fulcrum adjusting screw member, this clutch being operable through a gear train in response to more than a chosen number of revolutions of the brake-applying screw effected by unwinding of the spiral spring upon a reduction in the amount of current supplied to the torque motor.

This unidirectional clutch of the novel slack adjuster comprises two substantially C-shaped clutch members disposed on opposite sides of a non-threaded portion of the fulcrum adjusting screw member and normally biased into contact with this non-threaded portion of the screw member by a pair of springs each interposed between one of a pair of substantially diametrically arranged arms integral with one clutch member and one of a pair of substantially diametrically arranged arms integral with the other clutch member. Each adjacent pair of arms of the two clutch members is pivotally connected by a link that is rockable about its pivotal connection with one clutch member to effect movement of the other clutch member against the yielding resistance of the corresponding spring out of clutching contact with the non-threaded portion of the screw member. Rocking movement of these links in one direction or in an opposite direction is effected by a pair of substantially diametrically arranged pins carried by one gear of a gear train driven in response to rotation of the brake-applying screw in one direction or in an opposite direction according to an increase or a decrease in the current supplied to the torque motor of the brake assembly.

In the accompanying drawings:

FIG. 1 is a side elevational view of a brake assembly embodying the invention, showing a pair of brackets by which the brake assembly may be mounted on a railway passenger car truck.

FIG. 2 is a vertical cross-sectional view, taken along the line 2—2 of FIG. 3 and looking in the direction of the arrows, of a brake assembly showing a spring-applied torque motor released brake linkage together with a slack adjuster mechanism and a clutch mechanism for operating a pair of brake application indicating light switches.

FIG. 4 is a horizontal cross-sectional view, taken along the line 4—4 of FIG. 2 and looking in the direction of the arrows, showing details of a pair of spring seats and a pair of cushioning springs interposed therebetween, for providing a yieldable connection between a traveling nut and a brake lever.

FIG. 5 is a vertical cross-sectional view, taken along the line 5—5 of FIG. 2 and looking in the direction of the arrows, showing details of the pivotal connection between a brake lever and its adjustable fulcrum member.

FIG. 6 is a plan view of a micro switch device and an operating mechanism therefor looking in the direction of the arrows indicated on FIG. 2.

FIG. 7 is an enlarged isometric view of a manual release lever.

FIG. 8 is a vertical right-hand end elevational view, with an end cover and a torque motor shown in FIG. 1 removed, to show structural details of a novel slack adjuster clutch mechanism constituting a second embodiment of the invention.

FIG. 9 is a vertical cross-sectional view, taken along the line 9—9 of FIG. 8 and looking in the direction of the arrows, showing further structural details of the novel clutch mechanism shown in FIG. 8.

FIG. 10 is an enlarged elevational view, showing certain structural details of the clutch mechanism not made apparent in FIG. 8.

DESCRIPTION—FIGS. 1 TO 7

Figure 3:
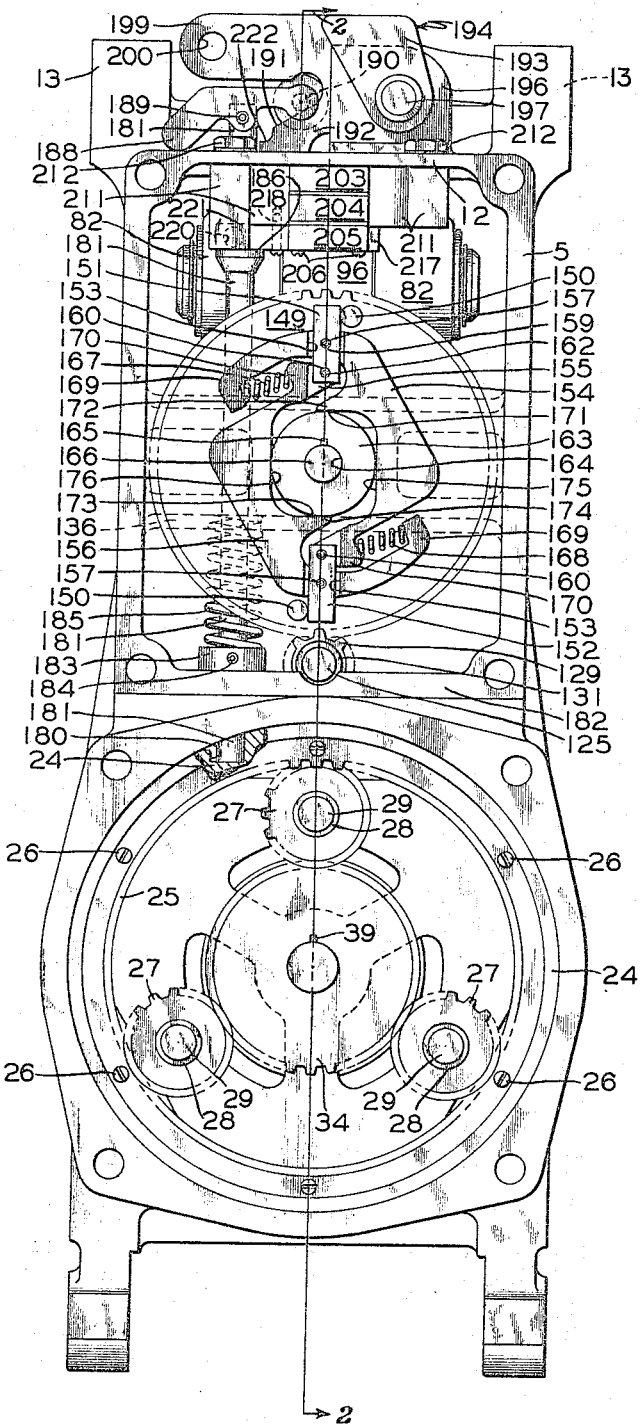
FIG. 3 is a vertical right-hand end elevational view with an end cover and a torque motor shown in FIG. 1 removed, to show further structural details.

As shown in FIG. 1 of the drawings, each of four brake assemblies associated respectively with the four wheels of each one of two car trucks of a railway vehicle comprises a brake head 1 to which a brake shoe 2 is secured in the usual manner by a key 3, an external brake head hanger or actuating lever 4, and a sectionalized casing or support member comprising a main casing section 5 having formed integral therewith a bracket 6 that has therein a bore 7 (FIG. 2) in which is press-fitted a bushing 8 in which is rotatably mounted a pin 9 that extends through the opposite jaws of a clevis 10 formed at the lower end of the actuating lever 4, whereby the actuating lever 4 is pivotally mounted on the bracket 6. As shown in FIGS. 1 and 2, each of two opposite, parallel and spaced-apart sides of the casing section 5 is provided adjacent its lower end on both the outside and inside face thereof with a raised portion through which and the wall integral therewith extend two spaced-apart bores 11 that are coaxial with the corresponding bores in the other side which bores are for receiving cap screws. Extending upwardly from a top wall 12 of the main casing section 5 are two spaced-apart parallel lugs 13, both of which appear in FIG. 3 of the drawings. Each of the two parallel and spaced-apart lugs 13 are provided with two spaced-apart bores 14, which bores appear in FIGS. 1 and 2, that are coaxial with the corresponding bores in the other lug. The above-mentioned raised portions formed on the outside of the two parallel sides of the main casing section 5 constitute flat surfaces 15 which abut corresponding flat surfaces formed on angle brackets (not shown) which are secured, as, for example, by welding, to a truck frame of a railway car truck. Therefore, cap screws (not shown) which extend through the bores 11 and 14 secure the main casing section 5 rigidly to the angle brackets.

As shown in FIG. 2, the right-hand side wall of the main casing section 5 is provided with a bore 16 and a coaxial counterbore 17.

Disposed in the counterbore 17 is a cup-shaped bearing guide member 18 having a bore 19 and two coaxial counterbores 20 and 21. The bearing guide member 18 is also provided with an arcuate slot 22 for a purpose hereinafter made apparent.

The main casing section 5 is provided with a second counterbore 23 that is coaxial with the counterbore 17 in this casing section. A rotatable spring barrel 24, open at both ends, is disposed in the counterbore 23, as shown in FIG. 2. The right-hand open end (not shown) of the spring barrel 24 has disposed therein a planetary gear unit, which planetary gear unit may be substantially the same as the planetary gear unit shown and described in the hereinbefore-mentioned Patent 3,280,944. Therefore, a detailed description of this planetary gear unit in this application is deemed unnecessary.

Briefly, however, this planetary gear unit comprises, as shown in FIG. 3 of the drawings, an annular internal gear 25 that is disposed in a counterbore (not shown) formed in the right-hand end of the spring barrel 24 (FIG. 2) and secured thereto by a plurality of screws 26 (FIG. 3). As shown in FIG. 3, the annular internal gear 25 has a line of contact with three equally arcuately spaced gears 27. Each of the three gears 27 is rotatably mounted on a corresponding one of three bushings 28 which is press-fitted onto one end of a corresponding short shaft 29, the three shafts 29 being equally arcuately spaced, as shown in FIG. 3, and having their respective opposite ends press-fitted into a corresponding bore (not shown) formed in a spring arbor or planet carrier, only a hub 30 of which appears in FIG. 2.

A torque motor 31, which is shown in FIG. 1, is secured to the right-hand side of the main casing section 5 by a plurality of cap screws 32, two of which appear in FIG. 1, that extend through smooth bores (not shown) in a flange 33 formed integral with the housing of the torque motor 31 and have screw-threaded engagement with corresponding screw-threaded bores (not shown) formed in the main casing section 5.

The torque motor 31 is provided with an armature shaft (not shown) on the left-hand end of which is mounted for rotation therewith a sun gear 34 of the planetary gear unit, which sun gear 34, as shown in FIG. 3 of the drawings, has a line of contact with each of the three gears 27.

As shown in FIG. 2, the right-hand end of a screw 35 having a specially formed concave helical groove 36 is provided with a cylindrical portion 37 of a reduced diameter that extends into a bore 38 formed in the hub 30 of the above-mentioned spring arbor. This cylindrical portion 37 and the hub 30 are provided with corresponding key-ways in which is disposed a first key 39 that serves to provide a driving connection between the spring arbor and the screw 35.

The left-hand end of the screw 35 is provided with a first portion 40 of reduced diameter that is mounted in a ball bearing 41 that is carried in a counterbore 42 formed in a boss 43 that is integral with the left-hand wall of the main casing section 5 and extends outward from the outside face thereof, the counterbore 42 being coaxial with a bore 44 in this side wall through which bore 44 a second portion 45 of reduced diameter of the screw 35 extends, the diameter of portion 45 slightly exceeding the diameter of the portion 40.

The left-hand end of the portion 40 of reduced diameter is provided with screw threads for receiving a nut 46 between which and the ball bearing 41 is disposed a lock washer 47 whereby the ball bearing 41 is retained in the counterbore 42 by the lock washer and nut. In order to prevent damage by dust and dirt to the ball bearing 41, the outer end of the boss 43 is provided with a counterbore 48 in which is mounted an end member 49. The end member 49 is provided with a peripheral annular groove in which is partly disposed an O-ring 50 that is also partly disposed in a groove formed in the wall surface of the counterbore 48. The O-ring 50 releasably secures the end member 49 to the boss 43 and also prevents the entrance of dirt and water which would be detrimental to the ball bearing 41.

As shown in FIG. 2 of the drawings, the right-hand side of the left-hand vertical wall of the main casing section 5 is provided with a counterbore 51 in which is disposed a ball-type thrust bearing 52 that surrounds the second portion 45 of reduced diameter of the screw 35. This thrust bearing 52 is retained in the counterbore 51 by a snap ring 53 that is inserted in a peripheral annular groove formed in the screw 35 and an annular retaining member 54 that is interposed between the thrust bearing 52 and a shoulder 55 that is formed at the left-hand end of the threaded portion of the screw 35.

The outer end of a spiral spring 56 is anchored to the spring barrel 24. The hub 30 carries a radially extending pin, the cross section of the outer end of which is a right triangle. This pin extends through a hole formed adjacent the inner end of the spiral spring 56 and is so disposed that the hypotenuse of the right triangle forming the outer end of the pin is adjacent that end of the hole in the spring that is most remote from the inner end of the spiral spring. This construction provides for the spring arbor and its hub 30 to be driven in only a clockwise direction by the spiral spring 56, since the remote end of the hole in the spring will ride up the hypotenuse of the right triangle and prevent the spring from driving the spring arbor and its hub 30 in a counterclockwise direction.

Disposed about the hub 30 and on the right-hand side of a snap ring 57 that is inserted in a peripheral annular groove formed in the hub 30, and on the left-hand side of the spiral spring 56, is a flat annular plate 58. This plate acts to retain the spiral spring 56 within the spring barrel 24.

As shown in FIGS. 2 and 4, the screw 35 has mounted thereon a traveling nut 59, which nut has formed internally a concave helical groove that corresponds to the helical groove 36 formed on the screw 35. A plurality of balls 60 (FIG. 4) are disposed in the groove 36 and the corresponding helical groove in the traveling nut 59. The traveling nut 59 is provided or fitted with a pair of tubular ball guides 61 (FIG. 2) which interrupt the path of the balls 60, deflect them from the helical groove 36 and the corresponding groove in the traveling nut 59, guide them diagonally across the outside of the nut 59, and lead them back again into the helical groove 36 in the screw 35 and the corresponding helical groove in the traveling nut 59 at points longitudinally spaced along the screw 35 from the point at which they leave the groove 36 to enter the respective ball guide 61. This arrangement forms two closed circuits through which the rolling balls, as the medium of engagement between the screw 35 and the traveling nut 59, recirculate continually as the screw 35 and the traveling nut 59 are rotated relative to each other. Thus, the rotary motion of the screw 35 is changed to linear motion of the nut 59 with minimum frictional loss.

It should be understood that the screw 35 and the traveling nut 59 may be any suitable commercial type of ball-bearing screw.

As can be seen from FIGS. 2 and 4, the left-hand end of the traveling nut 59 is provided with external screw threads 62, it being understood that the outer periphery of the traveling nut 59 is cylindrical and has disposed thereabout a U-shaped lever spring seat 63, the legs of which, as shown in FIG. 4, are provided with a pair of diametrically arranged bores 64 in each of which is disposed a trunnion lug 65. Each trunnion lug 65 is retained in its corresponding bore 64 by means of, for example, a set screw 66 that has screw-threaded engagement with a screw-threaded bore formed in a corresponding leg of the U-shaped lever spring seat 63 and extends into a groove formed adjacent one end of the trunnion lug. As can be seen in FIG. 4, the opposite end portion of each trunnion lug 65 extends to the exterior of the corresponding bore 64 and has press-fitted thereon a wear bushing 67.

Each leg of the U-shaped lever spring seat 63 has extending from the left-hand side thereof, as shown in FIG. 4, a boss 63a on which is mounted one of a pair of first spring seats 68. As can be seen from FIG. 4, interposed between each spring seat 68 and one of a pair of corresponding second spring seats 69 is one of a pair of identical springs 70. Each of the spring seats 69 is mounted on a corresponding one of a pair of bosses 71 each of which is formed integral with one of a pair of ball nut spring seats 72. Each ball nut spring 72 is provided with a bore 73 into which is press-fitted a bushing 74 through which extends one of a pair of diametrically arranged trunnion lugs 75. Each trunnion lug 75 is provided at one end with a head, and in addition to extending through the corresponding bushing 74, also extends through a coaxial bore 76 formed in one of one of a pair of diametrically arranged ears 77 that are integral with a ball nut trunnion 78 that is provided with a screw-threaded central bore that has screw-threaded engagement with the external screw threads 62 on the left-hand end of the traveling nut 59. Each trunnion lug 75 is securely anchored to its corresponding ear 77 integral with the ball nut trunnion 78 by means of one of a pair of pins 79 that extends through coaxial bores in the respective trunnion lug 75 and its corresponding ear.

Each leg of the U-shaped lever spring seat 63 is provided with two bores (not shown), and each one of the two ball nut spring seats 72 is provided with two bores (not shown) having the same diameter as the bores in the legs of the U-shaped lever spring seat 63 whereby the U-shaped lever spring seat 63 is connected to the two ball nut spring seats 72, carried by the ball nut trunnion 78, by means of four bolts 80, a portion of two of which appear in FIG. 4, and four nuts 80a, two of which appear in FIG. 4. The pair of springs 70 is effective to bias the two ball nut spring seats 72 against the heads of the bolts 80 and the legs of the U-shaped lever spring seat 63 against the nuts 80a.

The wear bushings 67, carried by the respective trunnion lugs 65 are respectively straddled by U-shaped openings in lower legs 81, only one of which appears in FIG. 2 of the drawings, formed on the lower end of a brake lever 82 which, as can be seen from FIG. 5, is provided with a pair of parallel spaced-apart arms 82a, whereby the brake lever 82 is pivotally mounted intermediate the ends of the arms 82a on a longitudinally movable fulcrum member 83 by means of a pair of pins 84.

As shown in FIG. 5, each of two opposite parallel sides of the fulcrum member 83, which is rectangular in cross section, is provided with a bottom bore 85 in which is press-fitted a wear bushing 86 in which is disposed one end of one of the pins 84, which pin extends into a bore 87 coaxial with the bottom bore 85 and extending through one of the upper arms 82a of the brake lever 82. The length of the pins 84 is such that when one end of a pin 84 abuts the inner end of the bottom bore 85, the opposite end is disposed inward from the outer end of the corresponding bore 87 thereby to provide for retaining the respective pin 84 in the bore 87 by means of a corresponding snap ring 88 that is inserted in a groove formed in the wall of the bore 87. Each pin 84 is provided with a screw-threaded bottom bore 89 for receiving a screw-threaded bolt by which the pin 84 can be removed subsequent to removal of the snap ring 88, by exerting a pull on the bolt.

The fulcrum member 83 is provided with an internal screw-threaded bore 90, whereby the fulcrum member 83 has screw-threaded engagement with and is movably mounted on an adjusting screw 91 of a slack adjuster mechanism, hereinafter described in detail.

The upper portions of the two parallel spaced-apart arms 82a constitute the jaws of a clevis, in which jaws are supported the opposite ends of a pin 92 which extends with a turning fit through a bore 93 in a bushing 94 that is press-fitted into a bore 95 formed in a hub-member 96 that is disposed between the two spaced-apart arms 82a that constitute the jaws of the clevis.

The hub member 96 comprises one member of a spring-biasing type of "snow brake" that constitutes a resilient link or brake actuating rod for connecting the brake lever 82 to the hereinbefore-mentioned brake head 1 and brake head hanger or actuating lever 4. The hub member 96 is provided, as shown in FIG. 2 of the drawings, with a bottom bore 97 the axis of which is at a right angle to and intersects the axis of the pin 92, and a bore 98 the axis of which is at a right angle to and intersects the axis of the bottom bore 97. Disposed in the bottom bore 97 is one end of an actuating rod 99 that is provided adjacent this one end with a bore 100 for receiving a pin 101 the opposite ends of which are disposed in the bore 98 in the hub member 96, whereby the pin 101 rigidly connects the rod 99 to the hub member 96.

The rod 99 has a lost-motion connection with one end of a brake rod 102 the opposite end of which is pivotally connected to one end of the brake head hanger 4 and the brake head 1 as by a pin 103 and a cotter pin (not shown). This lost-motion connection constitutes and provides a "snow brake" which will now be described in detail.

The right-hand end of the brake rod 102, as shown in FIG. 2, is provided with a bottom bore 104 in which is disposed a spring 105 that is interposed between the left-hand end of the bottom bore 104 and the left-hand end of the rod 99 that extends into the open end of the bottom bore 104 and is operatively connected to the brake rod 102 by a pin 106 press-fitted into a bore 107 in the rod 99, which pin 106 has its opposite ends disposed in a bore 108 in the brake rod 102, the diameter of which bore 108 substantially exceeds the diameter of the pin 106 to thereby provide limited movement, or "lost motion," of the rod 99 and hub member 96, against the yielding resistance of the spring 105, with respect to the brake rod 102. In actual practice, the limited movement of the rod 99 and hub member 96 with respect to the brake rod 102 may, for example, be $\frac{3}{32}$ of an inch.

As shown in FIG. 2, the left-hand end of the brake rod 102 extends through a suitable opening 109 in the left-hand wall of the main casing section 5 to the exterior thereof. In order to prevent the entrance of water, ice and dirt to the interior of the main casing section 5, a rubber boot 110 surrounds the opening 109 in the left-hand wall of the main casing section 5. The opposite ends of the boot 110 are provided with beads which fit respectively around the periphery of the brake rod 102 and an annular plate 111 that is secured to the main casing section 5 as by a plurality of cap screws 112, two of which appear in FIG. 2.

It is apparent from FIG. 1 that as the braking surface of the brake shoe 2 carried by the brake head 1 wears away, the travel of the brake rod 102 in the direction of the left hand will increase progressively with successive applications of the brakes. It is also apparent that subsequent to a limited amount of brake shoe wear, for example, three thirty seconds of an inch, which, as aforestated, may be the amount of lost motion between the hub member 96 that carries the rod 99 and the brake rod 102, the "snow brake" would become inoperative since, upon return of the brake lever 82 to its release position, the brake shoe 2 would not be pressed into contact with the tread surface of its corresponding wheel 113 for the reason that the brake rod 102 can be moved by the spring 105 in the direction away from hub member 96 only a distance of, for example, as stated above, three thirty seconds of an inch. Therefore, in order to maintain the "snow brake" operative to always, while the brakes are released, press the brake shoe 2 into contact with the tread surface of its corresponding wheel 113 with the same degree of force, and also in order to maintain the same travel distance of the hub member 96 and rod 99 carried thereby upon each subsequent application of the brakes as the brake shoe 2 wears away, the spring-applied power-release package brake assembly of the present invention is provided, in addition to the "snow brake" described above, with a slack take-up or adjusting mechanism, which will now be described in detail.

As shown in FIG. 2, the above-mentioned slack adjusting mechanism is operated in response to rotation of the brake-applying screw 35 via a gear train that comprises a spur gear 114 provided with a hub 115 that has a bore having formed therein a key-way for receiving a second key 116 that extends into the left-hand portion of the key-way in which the hereinbefore-mentioned first key 39 is disposed, this second key 116 also serving to provide a driving connection between the spur gear 114 and the portion 37 of reduced diameter of the screw 35.

It will be noted from FIG. 2 that the hub 115 of the spur gear 114 serves to support the inner race of a ball-bearing 117 the outer race of which is press-fitted into the bore 19 in the cup-shaped bearing guide member 18 having the arcuate slot 22 through which the spur gear 114 extends.

Interposed between the hub 115 and the right-hand end of the screw threads formed on the screw 35, and in surrounding relation to cylindrical portion 37 of the screw 35, is an annular traveling nut retaining member 118 movement of which in the direction of the right hand, as viewed in FIG. 2, is limited by a snap ring 119 that is inserted in a peripheral annular groove formed in the portion 37 of the screw 35. Thus, the retaining member 118 and the snap ring 119 prevent the traveling nut 59 from traveling in the direction of the right hand far enough for the balls carried within the traveling nut to fall out when assembling and disassembling the screw and traveling nut as a unit. It may be noted that the annular retaining member 54 and snap ring 53 serve the same purpose, in that they prevent the traveling nut 59 from traveling along the screw 35 too far in the direction of the left hand.

The spur gear 114 has a line of contact with a second spur gear 120 that has a smaller pitch diameter and a lesser number of teeth. The spur gear 120 is provided with a central bore whereby it may be press-fitted onto a hub member 121 that is provided with a bore having a key-way in which is disposed a key 122 that extends into a corresponding key-way formed adjacent one end of a shaft 123 that has integral therewith at its left-hand end a collar 124 against which abuts the left-hand side of the hub member 121.

The shaft 123 is provided with a cylindrical portion 125 of reduced diameter that extends through a bore in a brushing 126 that is press-fitted into a bore 127 formed in a boss 128 that is integral with the main casing section 5.

The length of the cylindrical portion 125 of the shaft 123 is such that when the right-hand side of the hub member 121 abuts the left-hand end of the bushing 126, this cylindrical portion extends beyond the right-hand end of the bushing 126 in order that a pinion 129 may be mounted thereon by means of key 130 that is disposed in a key-way formed in a central bore in the pinion and a corresponding key-way formed in the cylindrical portion 125 of the shaft 123, and a snap ring 131 that is inserted in a peripheral annular groove formed in the cylindrical portion 125 adjacent the right-hand end thereof.

As shown in FIG. 2, the right-hand wall of the main casing section 5 is provided with a large opening 132 that is normally closed by an end cover 133 that is secured to the main casing section 5 by a plurality of cap screws 134, two of which appear in FIG. 2. A gasket 135 is disposed between the end cover 133 and the main casing section 5 to prevent the entrance of dust and dirt to the interior of the main casing section 5.

Extending between the front and back walls of the main casing section 6 and integral at its respective ends with these walls is a bearing support arm 136 which, substantially midway its length, is provided with a screw-threaded bore 137 and a coaxial counterbore 138 that appear in FIG. 2 of the drawings. The internal screw threads of the bore 137 are the same diameter as that of the external screw threads formed on the hereinbefore-mentioned adjusting screw 91 in order that when assembling the brake assembly, and prior to securing the end cover 133 to the main casing section 5 by means of the cap screws 134, the left-hand end of the adjusting screw 91 may be inserted through the opening 132 and counterbore 138 and then, by rotation, screw threaded successively through the screw-threaded bore 137 in the bearing support arm 136 and the screw-threaded bore 90 in the fulcrum member 83 until a portion 139 of reduced diameter formed on the left-hand end of the adjusting screw 91 is disposed within a bushing 140 that is press-fitted into a bore 141 formed in a boss 142 that is integral with the left-hand wall of the main casing section 5.

Subsequent to screw threading the adjusting screw 91 successively through the screw-threaded bores 137 and 90 until the adjusting screw 91 is positioned as shown in FIG. 2, a bushing 143, that is provided with external screw threads that are the same diameter as the internal screw threads of the bore 137 and with a bore 144 of such a diameter as to provide a turning fit with a portion 145 of reduced diameter of the adjusting screw 91, is screw threaded into the screw-threaded bore 137 until the left-hand end of the bushing 143 abuts the right-hand end of the threaded portion of the adjusting screw 91. This bushing 143 is locked in place by a lock screw 146 that is screw threaded into a screw-threaded bore formed partly in the bushing 143 and partly in the bearing support arm 136.

Rotatably mounted on the right-hand end of the portion 145 of reduced diameter of the adjusting screw 91 is a bushing 147 that is press-fitted into a bore 148 that extends through the hub of a spur gear 149 that has a line of contact with the hereinbefore-mentioned pinion 129. As shown in FIG. 3, the spur gear 149 carries on one side thereof two identical pins 150 which are arcuately arranged 180° apart and on opposite sides and adjacent the opposite ends of a pair of identical U-shaped link members 151 and 152, the center lines of which link members lie in a straight line, as shown in FIG. 3.

The legs of the U-shaped link member 151 are disposed in grooves 153, one of which appears in FIG. 3 of the drawings, formed in the opposite sides of a first substantialy C-shaped clutch member 154 and on opposite sides of a tongue 155 formed at one end of a second substantially C-shaped clutch member 156. The U-shaped link member 151 is operatively connected to the C-shaped clutch member 154 by a pin 157 that has a press fit in a bore 158 (FIG. 2) formed in the clutch member 154 and a turning fit in a coaxial bore 159 (FIG. 3) that extends through the two spaced-apart legs of the U-shaped link member 151, which link member is also operatively connected to the tongue 155 of the C-shaped clutch member 156 by a pin 160 that has a press fit in a bore 161 (FIG. 2) extending through the tongue 155 and a turning fit in a coaxial bore 162 (FIG. 3) that extends through the two spaced-apart legs of the link member 151.

The legs of the U-shaped link member 152 are operatively connected to the clutch members 154 and 156 in the same manner as the legs of the U-shaped link member 151 are connected to the clutch members 156 and 154. Consequently, the pins shown in FIG. 3 for effecting this connection are denoted by the reference numerals 157 and 160.

As shown in FIG. 3 of the drawings, the substantially C-shaped clutch members 154 and 156 are oppositely arranged on opposite sides of a drum element 163 that is provided with a bore 164 having a key-way for receiving a key 165. This key 165, as shown in FIG. 2, extends into a corresponding key-way formed in a cylindrical end portion 166 of the adjusting screw 91 to provide a driving connection between the drum element 163 and the adjusting screw 91.

The substantially C-shaped clutch members 154 and 156 are each normally biased into gripping contact with the periphery of the drum element 163 at two points of contact that are spaced arcuately 90° apart by two identical springs 167 and 168. Each spring is disposed between an elbow-like arm 169 formed integral with and at one end of one clutch member and an arm 170 formed integral with and at the other end of the other clutch member whereby a flat surface 171 formed on a finger 172 integral with the clutch member 154 and a corresponding flat surface 173 formed on a finger 174 integral with the clutch member 156 are biased against the peripheral surface of the drum element 163 at points arcuately spaced 180° apart. These springs 167 and 168 are also effective to bias a flat surface 175 formed on the clutch member 154 and at a right angle to the flat surface 171 on the finger 172 integral with this clutch member, and a flat surface 176 formed on the clutch member 156 and at a right angle to the flat surface 173 on the finger 174 integral with this clutch member, against the peripheral surface of the drum element 163 at points arcuately spaced 180° apart, each of these points of contact being arcuately spaced 90° from the location at which the flat surface on the fingers 172 and 174 contact the peripheral surface of the drum element 163. Accordingly, it is apparent that the springs 167 and 168 are effective to bias the substantially C-shaped clutch members 154 and 156 toward the drum element 163 so that the periphery of the drum element 163 is gripped at four points arcuately spaced 90° apart whereby these clutch members are effective, when rotated in a manner hereinafter described in detail, to correspondingly rotate the drum element 163 and the adjusting screw 91 connected thereto by the key 165, and thereby effect longitudinal movement of the fulcrum member 83 along the adjusting screw 91.

As shown in FIG. 2 of the drawings, an annular member 177 is disposed about the cylindrical end portion 166 of the adjusting screw 91 and interposed between the drum element 163 and the end cover 133, the purpose of this annular member being to prevent movement of the drum element 163 to a position in which the key 165 could fall out of the keyway in the cylindrical end portion 166 which extends through a bore 178 in the end cover 133.

As shown in FIG. 2, the cylindrical end portion 166 on the right-hand side of the end cover 133 is provided with a bore 179 for receiving a rod (not shown) by which the adjusting screw 91 can be rotated in a direction to cause the fulcrum member 83 to move longitudinally in the direction of the right hand along the adjusting screw 91 to, through the brake lever 82, pin 92, hub member 96, pin 101, rod 99, pin 106, brake rod 102 and pin 103, move the brake head 1 to a position such that when a worn out brake shoe is replaced by a new brake shoe, the spring 105 will be effective, via the brake rod 102 and pin 103, to bias the new brake shoe carried by the brake head 1 into contact with the tread surface of the wheel 113 with the desired degree of force.

In case of a power failure to the torque motor 31 shown in FIG. 1, in order to provide for releasing the spring force pressing the brake shoe 2 against the tread surface of the wheel 113, a locking mechanism is provided for locking the spring barrel 24 (FIG. 2), which locking mechanism, when unlocked, releases the spring force pressing the brake shoe 2 carried by the brake head 1 against the tread surface of the wheel 113. This locking mechanism will now be described.

The periphery of the spring barrel 24 is provided with a plurality of arcuately spaced notches or indentations 180, one of which appears in FIG. 3 of the drawings. The spring barrel 24 is normally maintained stationary against rotation by the spiral spring 56 by reason of the lock provided by the lower end of a locking rod 181 which, as shown in FIG. 3, is normally disposed in one of the notches or indentations 180. The locking rod 181 extends through a bore (not shown) in a wall 182 of the bore 23 in the main casing section 5 and immediately above this wall is provided with a collar 183 which is connected to the rod 181 by a pin 184 that extends through a bore in the collar 183 and a coaxial bore in the locking rod 181. Disposed about the locking rod 181 and interposed between the collar 183 and the lower side of the bearing support arm 136 is a spring 185 to normally bias the locking rod 181 downward to the spring barrel locking position, in which the locking rod 181 is shown in FIG. 3.

The locking rod 181 extends upward through two coaxial bores in the bearing support arm 136 and a coaxial bore in the top wall 12 of the main casing section 5. As shown in FIGS. 3 and 6, the locking rod 181, above the bearing support arm 136 and below the top wall 12, carries thereon a collar 186 which is connected thereto by a pin 187 (FIG. 6). The lower end of the collar 186 is provided with a cone-shaped head, the purpose of which is to provide for operating a micro-switch device hereinafter described.

As shown in FIG. 3, the upper end of the locking rod 181 is operatively connected to a link 188 intermediate the ends thereof by means such as, for example, a pin 189. As can be seen from FIG. 3, the left-hand end portion of the link 188 is inclined at an angle of substantially 45° to the right-hand end portion which, as can be best seen in FIG. 2, has formed integral therewith and extending from one side thereof a cylindrical arm or pin 190. While the link 188 occupies the position in which it is shown in FIG. 3 of the drawings, the inclined left-hand end thereof contacts the upper surface of the top wall 12 of the main casing section 5 and the arm 190 that is integral therewith contacts or lies against an inclined surface 191 formed on an arm 192 that extends outward from and is integral with one jaw of a clevis 193 that is an integral part of a manual release lever 194 which is isometrically shown in FIG. 7 of the drawings.

Each jaw of the clevis 193 is provided with a bore 195 that is coaxial with the bore in the other jaw, only one of these bores appearing in FIG. 7. These jaws of the clevis 193 of the manual release lever 194 are disposed on the opposite sides of an upstanding ear 196 (FIG. 3) that is formed integral with the top wall 12 of the main casing section 5 and has a bore of the same diameter as the bore 195 in the jaws of the clevis 193 for receiving a headed pin 197 that also extends through the bore 195 in the jaws of the clevis. The pin 197 is retained in place by a cotter pin 198 (FIG. 2).

As shown in FIGS. 3 and 7 of the drawings, the manual release lever 194 has a forwardly extending arm 199 that is integral with the same jaw of the clevis 193 as the arm 192 and is provided with a bore 200 for a purpose hereinafter made apparent.

As shown in FIGS. 1 and 2 of the drawings, the cylindrical arm 190 of the link 188 extends across the inclined surface 191 on the arm 192 and thence through an annular washer 201 that is retained on the arm 190 by a cotter pin 202. The washer 201 prevents movement of the arm 190 out of contact with the inclined surface 191 and rotation of the locking rod 181 on its own vertical axis as a result of vibration.

A railway car, each of the eight wheels of which is provided with a novel brake assembly of the present invention, is also provided with three colored indicating lamps, two of which are located exteriorly of the car on each side of the back end thereof. The third colored indicating lamp is located within the car adjacent the front end thereof in a position in which it may be readily observed by the engineer. These indicating lamps are connected in an electrical circuit in parallel with the torque motors of the eight brake assemblies. Three single-pole double-throw micro-switch devices, each having a single contact, are associated with each of these brake assemblies and are operated thereby to control energization and deenergization of the indicating lamp, in a manner now to be explained.

The electrical circuit including the colored indicating lamps, the respective contact of each of the three micro-switch devices and the torque motors, together with a source of electrical power supply and a remote-controlled motor-operated rheostat, is the same as the electrical circuit shown and described in the hereinbefore-mentioned Patent 3,280,944. Therefore, a detailed description is deemed unnecessary in this application.

As shown in FIGS. 2 and 3 of the drawings, three microswitch devices 203, 204 and 205 are arranged in a stack and are secured to the bottom side of the top wall 12 of the main casing section 5 by a pair of cap screws 206.

Each of the three micro-switch devices 203, 204 and 205 is provided with a contact actuating plunger 207 for actuating the single contact of the corresponding micro-switch device.

As shown in FIG. 2, the contact actuating plungers 207 of the micro-switch devices 203 and 204 are adapted to be simultaneously actuated by a thin flat actuating plate 208 one end of which is integral with the bight of a thin U-shaped member 209 the upper leg of which is clamped between the micro-switch device 203 and the top wall 12 of the main casing section 5 and the lower leg of which is clamped between the micro-switch devices 204 and 205. It should be understood that since one end of the flat actuating plate 208 is integral with the U-shaped member 209, this plate has sufficient flexibility to operate the actuating plungers 207 of the micro-switch devices 203 and 204 when it is flexed in the direction of these micro-switch devices.

The actuating plate 208 is adapted to be flexed in the direction of the micro-switch devices 203 and 204 to actuate their respective actuating plungers 207 by the right-hand end of a rod 210 that slidably extends through a bore (not shown) in a lever mounting bracket 211 that, as shown in FIG. 3, is secured to the bottom side of the top wall 12 of the main casing section 5 by a pair of cap screws 212 that extend through smooth bores (not shown) in the top wall 12 and have screw-threaded engagement with coaxial screw-threaded bottom bores (not shown) formed in the lever mounting bracket 211. As shown in FIG. 2, the left-hand end of the rod 210 is slidably mounted in a bottom bore 213 formed in the top wall 12 of the main casing section 5.

The rod 210 is actuated by a slip clutch device 214 carried by the hub member 96. The slip clutch device 214 comprises two clutch elements or fingers 215, only one of which appears in FIG. 2, disposed on opposite sides of the rod 210. These spaced-apart fingers may be integral with and extend from one end of a screw-threaded bolt 216 that has screw-threaded engagement with a screw-threaded bore in the hub member 96. The opposite ends of a tension spring (not shown) are connected to the two fingers 215 to bias them into contact with the peripheral surface of the rod 210, the tension of the spring being such as to allow the fingers 215 to slide along the rod 210 subsequent to the rod being moved in the direction of the left hand from the position shown in FIG. 2 to a position in which the left-hand end of the rod 210 abuts the left-hand end of the bottom bore 213. It should be understood that the depth of the bottom bore 213 is sufficient to allow the rod 210 to be moved by the clutch device 214 in the direction of the left hand from the position in which it is shown in FIG. 2 in response to counterclockwise rocking of the brake lever 82 to cause operation of the micro-switch devices 203 and 204, it being understood that the contact actuating plungers 207 of these two micro-switch devices move in the direction of the left hand as the right-hand end of the rod 210 is moved in the direction of the left hand away from the flexible actuating plate 208.

As shown in FIG. 6 of the drawings, the contact actuating plunger 207 of the micro-switch device 205 is actuated in response to the rocking of a lever 217 that is pivotally mounted intermediate its ends on the lever mounting bracket 211 by means such as, for example, a screw 218 (FIGS. 3 and 6) that extends through a smooth bore in the lever 217 and has screw-threaded engagement with a coaxial screw-threaded bottom bore in the lever mounting bracket 211.

As shown in FIG. 6, the lever 217 is biased in a counterclockwise direction about the screw 218 by a spring 219 that is interposed between one end of the lever and the end of a shallow bottom bore 220 (FIG. 6) formed in one side of a leg 221 that is integral with and extends downward (as viewed in FIG. 3) from the lever mounting bracket 211.

As shown in FIG. 6, the lever 217 is held in the position shown against the bias of the spring 219 by the collar 186 carried on the locking rod 181 by the pin 187. When the locking rod 181 and collar 186 carried thereon are moved upward, as viewed in FIG. 3, when effecting a manual brake release, subsequent to an electrical power failure to the torque motor 31, in a manner hereinafter described in detail, the spring 219 is effective to bias the lever 217 counterclockwise and maintain the upper end of this lever, as viewed in FIG. 6, against the cone-shaped head on the collar 186 to thereby rock the lever 217 counterclockwise about the screw 218 to cause the lower end of the lever 217 to move the contact actuating plunger 207 of the micro-switch device 205 in the direction of the right hand to thereby operate the contact of this micro-switch device from one position to another.

OPERATION—FIGS. 1 TO 7

When the torque motor 31 (FIG. 1) of each brake assembly on a railway car is supplied with current through its respective power supply circuit, this torque motor is effective to rotate its armature shaft. It will be understood that the torque motor 31 of each of the eight brake assemblies on the car is simultaneously supplied with current through a circuit corresponding to that described in the above-mentioned Patent 3,280,944. Therefore, each of the eight torque motors is rendered effective to rotate its corresponding armature shaft. Since the operation of each brake assembly by its corresponding torque motor is the same, the operation of only one brake assembly will be described in detail.

Let it be assumed that when each brake assembly is initially assembled, the corresponding brake lever 82, lever spring seat 63 and ball nut trunnion 78 occupy the position in which they are shown in FIG. 2, in which position the two ball nut spring seats 72 carried by the ball nut trunnion 78 abut the inside surface of the left-hand wall of the main casing section 5. In this position, the brake shoe 2 carried by the brake head 1 (FIG. 1) is pressed against the tread surface of the corresponding wheel 113 by the spring 105 (FIG. 2) of the "snow brake."

Let it be further assumed that the spiral spring 56 is completely unwound, and that the lower end of the lock-the rod 181 (FIG. 3) is not disposed in any of the indentations 180 in the outer periphery of the spring barrel 24 but has been moved, in a manner hereinafter described in detail, to a position in which it will be slightly above the outer periphery of the spring barrel 24 so that the spring barrel can rotate without interference by the locking rod 181.

When electric current is supplied to each torque motor 31 in the manner described in detail in the hereinbefore-mentioned Patent 3,280,944, its armature shaft will rotate the sun gear 34 counterclockwise, as viewed in FIG. 3 of the drawings. This counterclockwise rotation of the sun gear 34 is effective to cause clockwise rotation of the three gears 27 about their respective bushings 28, each of which is press-fitted onto one end of a corresponding short shaft 29 carried by the spring arbor the hub 30 of which is connected by the key 39 to the cylindrical portion 37 of the screw 35. Since, as stated above, the two ball nut spring seats 72 carried by the ball nut trunnion 78 abut the left-hand wall of the main casing section 5, the traveling nut 59 cannot travel further in the direction of the left hand. Therefore, the screw 35 and the spring arbor cannot rotate in the direction to move the traveling nut 59 in the direction of the left hand, as viewed in FIG. 2. Since the spring arbor cannot rotate in the direction to move the traveling nut 59 in the direction of the left hand, the above-mentioned clockwise rotation of the three gears 27 about their respective bushings 28 is effective to cause the annular internal gear 25 and the spring barrel 24 to rotate clockwise, as viewed in FIG. 3. Since the outer end of the spiral spring 56 is anchored to the spring barrel 24, this clockwise rotation of the spring barrel 24 and annular internal gear 25 carried thereby will effect windup of the spiral spring 56. Consequently, the continued clockwise rotation of spring barrel 24 and gear 25 will effect a complete windup of the spiral spring 56.

Subsequent to the complete windup of the spiral spring 56 of each of the eight brake assemblies on the two-truck car, the locking rod 181 of each brake assembly is moved downward, in a manner hereinafter described, into one of the indentations 180 in the periphery of the corresponding spring barrel 24, it being understood that the indentation in the periphery of the spring barrel is brought into alignment with the locking rod, in the manner described in detail in the above-mentioned Patent 3,280,944.

It may be noted that the initial potential energy in the spiral springs 56 may be varied as desired accordingly as these springs are completely wound up or are wound up to a chosen degree less than a complete windup, in proportion to the amount of current supplied to the corresponding torque motors 31, it being understood that the spring barrels 24 are locked in a manner hereinafter described in detail, subsequent to the spiral springs 56 being wound up to the desired degree.

In operation, when it is desired to effect a brake application, the engineer will, in the manner explained in detail in Patent 3,280,944, effect a reduction in the output torque of the torque motors 31, whereupon the corresponding spiral springs 56 unwind to release the stored energy in these springs until the remaining stored energy in each spring balances the reduced output torque of the corresponding torque motor.

As each spiral spring 56 unwinds to release the stored energy therein, this spiral spring effects clockwise rotation, as viewed in FIG. 3, of the spring arbor and its hub 30, since the inner end of the spiral spring 56 is anchored to the hub 30. As the spring arbor is thus rotated clockwise, the three short shafts 29 anchored therein are carried therewith. Since the annular internal gear 25 is fixed or locked, the three gears 27 are therefore rotated counterclockwise on their respective bushings 28 and roll clockwise about the inside of the annular internal gear 25 as the spring arbor is rotated clockwise by the unwinding of the spiral spring 56. As the three gears 27 are thus rotated counterclockwise by the unwinding of the corresponding spiral spring 56, they are effective to rotate the sun gear 34 and the armature shaft of the torque motor 31 clockwise until the remaining stored energy in the spiral spring 56 balances the reduced output torque of the torque motor 31, it being understood that the reduction in the stored energy in the spiral spring 56 is the force now pressing the brake shoe 2 against the tread surface of the corresponding wheel 113 (FIG. 1), this force being transmitted to the brake shoe 2, in the manner now to be explained.

The hub 30 of the spring arbor is connected or keyed to the cylindrical portion 37 of the screw 35 by the key 39 (FIG. 2), as hereinbefore explained. Therefore, clockwise rotation of the spring arbor and its hub 30, as viewed in FIG. 3, is effective to rotate the screw 35 therewith in the ball bearing 41, it being understood that the spur gear 114 is rotated clockwise since the hub 115 of this gear is connected to the cylindrical portion 37 of the screw 35 by the key 116. This rotation of the screw 35 by the spiral spring 56 (via the spring arbor) is effective to cause the traveling nut 59 to travel along the screw 35 in the direction of the right hand, as viewed in FIG. 2, since the U-shaped openings in the lower legs 81 of the brake lever 82 straddle the wear bushings 67 carried by the respective trunnion lugs 65 each of which is connected by a corresponding set screw 66 to the U-shaped lever spring seat 63 to prevent turning of the traveling nut 59, as will now be explained.

The traveling nut 59 is restrained from rotation by the brake lever 82 since the U-shaped lever spring seat 63, which is connected to the brake lever 82 as explained above, is connected by the four bolts 80 and nuts 80a to the two ball nut spring seats 72 which are, in turn, connected by the trunnion lugs 75 and pins 79 to the ears 77 of the ball nut trunnion 78 that has screw-threaded engagement with the screw threads 62 formed on the periphery of the traveling nut 59, it being understood that the springs 70 interposed between the lever spring seat 63 and the ball nut spring seats 72 provide a yieldable or "lost-motion" connection between these spring seats. Therefore, as the screw 35 is rotated by the spiral spring 56, the traveling nut 59 will travel along the screw 35 in the direction of the right hand, as viewed in FIG. 2, to cause the brake lever 82 to rock counterclockwise about the pins 84 (FIG. 5) carried by the fulcrum member 83. Since the arms 82a of the brake lever 82 are connected to the hub member 96 by the pin 92, this counterclockwise rocking of the brake lever 82 is effective to move the hub member 96 in the direction of the left hand (FIG. 2) against the yielding resistance of the "snow brake" spring 105 to bring the left-hand end of the hub member 96 into abutting contact with the right-hand end of the brake rod 102, it being understood that prior to the left-hand end of the hub member 96 abutting the right-hand end of the brake rod 102, the spring 105 is effective, through the intermediary of brake rod 102 and brake head 1, to press the brake shoe 2 against the tread surface of the wheel 113 with a light force of such magnitude as to generate sufficient heat to prevent the accumulation of ice and snow. Subsequent to movement of the left-hand end of the hub member 96 into abutting contact with the right-hand end of the brake rod 102, a force will be transmitted through the hub member 96 and brake rod 102 to effect a braking action on the wheel 113.

As the spur gear 114 is rotated clockwise, as viewed in FIG. 3, simultaneously with clockwise rotation of the screw 35, this gear 114, by reason of its line of contact with the spur gear 120, is effective to cause counterclockwise rotation, as viewed in FIG. 3, of spur gear 120, hub member 121 on which the spur gear 120 is press-fitted, shaft 123 keyed to hub member 121 by key 122, and pinion 129 keyed to the portion 125 of the shaft 123 by the key 130. This counterclockwise rotation of the pinion 129, by reason of its line of contact with the spur gear 149, effects clockwise rotation, as viewed in FIG. 3, of the spur gear 149 and the two pins 150 carried thereby about the portion 145 of adjusting screw 91.

The gear ratio of the gear train that includes spur gears 114 and 120, pinion 129 and gear 149 is such that as the hub member 96 is moved from the position in which it is shown in FIG. 2 to the position in which the left-hand end of the hub member 96 abuts the right-hand end of the brake rod 102 and thereafter transmits a braking force through the brake rod 102 to effect a braking action on the wheel 113 without any wearing away of the brake shoe 2 or tread surface of wheel 113, the spur gear 149 is rotated from the position in which it is shown in FIG. 3 in which the upper pin 150 contacts the right-hand side of the U-shaped link member 151 and the lower pin 150 contacts the left-hand side of the U-shaped link member 152 to a position in which the upper pin 150 contacts the right-hand side of the U-shaped link member 152 and the lower pin 150 contacts the left-hand side of the U-shaped link member 151. Therefore, when no brake shoe wear occurs during a brake application, neither of the U-shaped link members 151 and 152 is moved or rocked from the position shown in FIG. 3, and the springs 167 and 168 remain effective to bias the C-shaped clutch members 154 and 156 into clutching contact with the drum element 163. Consequently, no rotation of the adjusting screw 91 is effected.

When it is desired to effect a release of the brake application, the engineer will, in the manner explained in detail in the hereinbefore-mentioned Patent 3,280,944, effect a restoration of the energization of the eight torque motors 31 on the two-truck car until these motors are supplied with maximum current, whereupon the torque output of each torque motor 31 will increase to its maximum value. Consequently, the torque motor 31, shown in FIG. 1, will now, through the above-described planetary gear unit, effect rotation of the screw 35 in the direction to cause the traveling nut 59 to travel along the screw 35 in the left-hand or brake-releasing direction since the traveling nut 59 is restrained from rotation in the manner hereinbefore explained in detail. As the traveling nut 59 thus moves along the screw 35 in the direction of the left hand until the two ball nut spring seats 72 carried by the ball nut trunnion 78, which has screw-threaded engagement with the screw threads 62 formed on the left-hand end of the traveling nut 59, abut the left-hand wall of the main casing section 5, it is effective to rock the brake lever 82 in a clockwise direction to its brake release position in which it is shown in FIG. 2, it being noted that movement of the traveling nut 59 is transmitted through the ball nut trunnion 78, ears 77, trunnion lugs 75, ball nut spring seats 72, bolts 80 and lever spring seat 63. As the brake lever 82 is thus rocked to its release position in which it is shown in FIG. 2, the hub member 96 is moved in the direction of the right hand since it is operatively connected to the arms 82a of the brake lever 82 by the pin 92. As the hub member 96 is thus moved in the direction of the right hand, the left-hand end of this hub member 96 is moved away from the right-hand end of the brake rod 102 since the spring 105 is effective, through the brake rod 102 and the brake head 1, to maintain the brake shoe 2 in contact with the tread surface of the wheel 113 and press the brake shoe 2 against the tread surface of the wheel with a light force of such magnitude as to generate sufficient heat to prevent the accumulation of ice and snow.

Since the ball nut spring seats 72 now abut the left-hand wall of the main casing section 5, the traveling nut 59 cannot travel along the screw 35 any further in the direction of the left hand. Consequently, the torque motor 31 is stalled in the brake release position of the brake lever 82.

It should be understood that each torque motor 31 is provided with sufficient heat radiation capacity that it may remain in a stalled condition for an indefinite period of time in which the brakes are released without overheating the torque motor.

Since the spur gear 114 (FIG. 2) is keyed by the key 116 to the cylindrical portion 37 of the screw 35, this gear will be rotated counterclockwise, as viewed in FIG. 3, simultaneously with rotation of the screw 35 in the direction to cause the traveling nut 59 to travel along the screw 35 in the direction of the left hand to the brake release position. This counterclockwise rotation of the spur gear 114, by reason of its line of contact with the spur gear 120, will effect simultaneously clockwise rotation of the spur gear 120 and pinion 129, and this clockwise rotation of the pinion 129 will, by reason of its line of contact with the spur gear 149, cause counterclockwise rotation, as viewed in FIG. 3, of the spur gear 149 from the previously-described position in which the upper pin 150 contacts the right-hand side of the U-shaped link member 152 and the lower pin 150 contacts the left-hand side of the U-shaped link member 151, to the position in which this gear 149 and the pins 150 carried thereby are shown in FIG. 3.

From the foregoing, it is apparent that if no wear of the brake shoe 2 occurs while a brake application is in effect, the C-shaped clutch members 154 and 156 are not moved out of clutching contact with the peripheral surface of the drum element 153 and remain biased into clutching contact with this peripheral surface by the springs 167 and 168. Therefore, no rotation of the adjusting screw 91 is effected when releasing the brake application.

Let it now be supposed that a brake application has been effected in the manner hereinbefore described in detail and that appreciable wear of the brake shoe 2 or the tread surface of the wheel 113 occurs while the brake application is in effect. As the braking surface of the brake shoe 2 wears away, the spiral spring 56 will further unwind and thereby effect rotation of the screw 35 in the direction to cause the traveling nut 59 to travel along the screw in the direction of the right hand, as viewed in FIG. 2. As the traveling nut 59 thus travels along the screw 35, it is effective, through the intermediary of the hereinbefore-described yielding connection between the traveling nut 59 and the brake lever 82, to further rock the brake lever 82 counterclockwise about the pins 84. This counterclockwise rotation of the brake lever 82 is effective to move the hub member 96 and the brake rod 102 in the direction of the left hand, as viewed in FIG. 2, and thereby maintain the brake shoe 2 pressed against the tread surface of the wheel 113 as either of the braking surface of the brake shoe 2 or the tread surface of the wheel 113 wears away.

Upon effecting the above-mentioned brake application and prior to the wearing away of the braking surface of the brake shoe 2 or the tread surface of the wheel 113, the rotation of the screw 35 effects, via the gear train including spur gears 114 and 120 and pinion 120, clockwise rotation, as viewed in FIG. 3, of the spur gear 149 and the pins 150 carried thereby from the position in which they are shown in FIG. 3 to a position in which the upper pin 150 contacts the right-hand side of the U-shaped link member 152 and the lower pin 150 contacts the left-hand side of the U-shaped link member 151.

Since the upper pin 150 contacts the right-hand side of the U-shaped link member 152 and the lower pin 150 contacts the left-hand side of the U-shaped link member 151 prior to wearing away of either the braking surface of the brake shoe 2 or the tread surface of the wheel 113, it will be apparent that as the braking surface of the brake shoe 2 or the tread surface of the wheel 113 wears away, the rotation of the screw 35 by the spiral spring 56 required to further rock the brake lever 82 in a counterclockwise direction in order to maintain the left-hand end of the hub member 96 in contact with the right-hand end of the brake rod 102 to thereby transmit a force to the brake head 1 and brake shoe 2, also effects simultaneous clockwise rotation of the gear 114, as viewed in FIG. 3. This rotation of the gear 114 is transmitted through the gear train to cause further clockwise rotation of the gear 149 and pins 150 from the hereinbefore-described position in which the upper pin 150 contacts the right-hand side of the U-shaped link member 152 and the lower pin 150 contacts the left-hand side of the U-shaped link member 151. As the gear 149 and the pins 150 carried thereby are further rotated in the clockwise direction from the above-described position, the forces exerted by the pins 150 on the U-shaped link members 151 and 152 are effective to rock these link members clockwise until the right-hand side of the U-shaped link member 151 contacts or strikes the upper right-hand corner of the grooves 153 in the C-shaped clutch member 154 and the left-hand side of this U-shaped link member 151 contacts or strikes the lower left-hand corner of these grooves 153, and the left-hand side of the U-shaped link member 152 strikes the lower left-hand corner of the grooves 153 in the C-shaped clutch member 156 and the right-hand side of this U-shaped link member 152 strikes the upper right-hand corner of these grooves 153.

The above-described simultaneous rocking of the U-shaped link members 151 and 152 is effective to move the C-shaped clutch members 154 and 156 against the yielding resistance of the springs 167 and 168 out of two-point clutching or gripping contact with the periphery of the drum element 163 since the ends of these link members are respectively pivotally connected to a corresponding end of one of these clutch members.

As the gear 149 and the pins 150 carried thereby continue to be rotated clockwise, as viewed in FIG. 3, as the braking surface of the brake shoe 2 or the tread surface of the wheel 113 continues to wear away, the pins 150 are effective, through the intermediary of the U-shaped link members 151 and 152, to rotate the C-shaped clutch members 154 and 156 clockwise relative to the now stationary drum element 163 which, as shown in FIG. 2, is keyed to the cylindrical end portion 166 of the adjusting screw 91 by the key 165. Consequently, it is apparent that as the braking surface of the brake shoe 2 or the tread surface of the corresponding wheel 113 wears away while a brake application is in effect, no rotation of the adjusting screw 91 is effected to cause the movable fulcrum member 83 to move along this adjusting screw.

When it is desired to effect a release of the brake application, the engineer will again increase the torque output of each troque motor 31 to its maximum value. Consequently, the torque motor 31, shown in FIG. 1, will now, through the above-described planetary gear unit, effect rotation of the screw 35 in the direction to cause the traveling nut 59 to move therealong in the direction of the left hand, as viewed in FIG. 2, to the brake release position in which it is shown.

This rotation of the screw 35 is effective, via the gear train including spur gears 114 and 120 and pinion 129, to rotate the spur gear 149 counterclockwise, as viewed in FIG. 3, to the position shown.

As the spur gear 149 begins to rotate counterclockwise, the pins 150 carried thereby are rotated therewith so that the lower pin 150 is moved away from the left-hand side of the U-shaped link member 151, and the upper pin 150 is moved away from the right-hand side of the U-shaped link member 152. As the pins 150 are thus moved in a direction away from the link members 151 and 152, the springs 167 and 168 are rendered effective to rock the links 151 and 152 out of contact with the sides of the grooves 153 and thereafter bias each of the C-shaped clutch members 154 and 156 into two-point clutching or gripping contact with the peripheral surface of the drum element 163.

As the gear 149 and pins 150 carried thereby continue to be rotated counterclockwise toward the position in which they are shown in FIG. 3, and prior to reaching this position, the upper pin 150 will contact the right-hand side of the U-shaped link member 151, and the lower pin 150 will contact the left-hand side of the U-shaped link member 152, it being understood that these link members do not, at this time, occupy the position in which they are shown in FIG. 3.

As the gear 149 and pins 150 carrier thereby continue to rotate counterclockwise to the position shown in FIG. 3, the pins 150 are effective, through the link members 151 and 152, to cause the C-shaped clutch members 154 and 156 to tightly grip the peripheral surface of the drum element 163 so that the clutch elements 154 and 156, the drum element 163 and the adjusting screw 91 are rotated counterclockwise simultaneously with the gear 149 and pins 150 since the drum element 163 is keyed by the key 165 to the cylindrical end portion 166 of the adjusting screw 91. Since the fulcrum member 83 is restrained against rotation by the pins 84, as shown in FIG. 5, the above-mentioned counterclockwise rotation of the adjusting screw 91 is effective to cause the fulcrum member 83 to travel longitudinally along the adjusting screw 91 in the direction of the left hand, as viewed in FIG. 2. It will be apparent from FIGS. 2 and 5 that as the fulcrum member 83 travels without rotation in the direction of the left hand along the adjusting screw 91 as this adjusting screw is rotated counterclockwise in the bushings or bearings 140 and 143, the brake lever 82 is moved or shifted simultaneously with its fulcrum member 83 such that upon the gear 149 and pins 150 carried thereby reaching the position in which they are shown in FIG. 3, the brake lever 82 and hub member 96 will be in such a position as to provide for the "snow brake" spring 105 (FIG. 2) biasing, through the intermediary of the brake rod 102, pin 103 and brake head 1, the brake shoe 2 against the tread surface of the corresponding wheel 113 (FIG. 1) with the same degree of force as before any wear of the braking surface of the brake shoe 2 or the tread surface of the wheel 113 occurred. Accordingly, it is apparent that applicant's novel slack adjuster mechanism is automatically operative, upon effecting a brake release subsequent to a brake application during which appreciable brake shoe or wheel wear occurred, to compensate for such wear by longitudinally moving the brake lever fulcrum member 83 along the adjusting screw 91 in the direction of the left hand, as viewed in FIG. 2, a distance proportional to the amount of wear of the braking surface of the brake shoe 2 and the tread surface of the wheel 113.

The simultaneous operation of the micro-switch devices 203 and 204 will now be described. As the brake lever 82 is rocked counterclockwise, as viewed in FIG. 2, about the pins 84 (FIG. 5) when effecting a brake application, the screw-threaded bolt 216 (FIG. 2) and the two fingers 215 integral therewith, by reason of the tension spring which biases these fingers into contact with the peripheral surface of the rod 210, are effective to shift the rod 210 in the direction of the left hand until the left-hand end of the rod 210 abuts the left-hand end of the bottom bore 213 in the top wall 12 of the main casing section 5. As the rod 210 is thus shifted in the direction of the left hand, its right-hand end is moved away from the thin flat actuating plate 208 one end of which is integral with the U-shaped member 209, as hereinbefore explained. Therefore, as the right-hand end of the rod 210 is moved away from the thin flat actuating plate 208, this plate will be rendered effective to flex in a direction away from the actuating plungers 207 of the micro-switch devices 203 and 204 to permit simultaneous movement of these plungers in the direction of the left hand, as viewed in FIG. 2.

The contacts of the respective micro-switch devices 203 and 204 are in the form of leaf springs which are flexed or bent when moved by the corresponding actuating plunger 207 to their open position. Therefore, when the rod 210 is moved away from the actuating plate 208, this actuating plate flexes away from the actuating plungers 207 whereupon the corresponding contacts of the micro-switch devices 203 and 204 are allowed to flex or straighten out and thereby move from their open to their closed position. These contacts of the microswitch devices 203 and 204, as they move from their open to their closed position, establish respectively a power supply circuit to the two colored indicating lamps located exteriorly of the car on each side of the back end thereof, and to the colored indicating lamp located within the car, these circuits being the same as the indicating lamp power supply circuits shown and described in the hereinbefore-mentioned Patent 3,280,944.

As the brake lever 82 is rocked counterclockwise to its brake-applied position subsequent to the left-hand end of the rod 210 abutting the left-hand end of the bottom bore 213, the spring-biased fingers 215 of the bolt 216 slide along the peripheral surface of the rod 210.

As the brake lever 82 is rocked clockwise when effecting a subsequent brake release, the spring-biased fingers 215 of the screw-threaded bolt 216 carried by the hub member 96 grip the periphery of the rod 210 and thereby shift this rod in the direction of the right hand, as viewed in FIG. 2. As the rod 210 is thus shifted in the direction of the right hand, the right-hand end of the rod 210 is shifted into contact with the left-hand side of the thin flat actuating plate 208. Continued shifting of the rod 210 in the direction of the right hand is effective to flex the thin flat actuating plae 208 to cause it to simultaneously move the respective actuating plungers 207 of the micro-switch devices 203 and 204 in the direction of the right hand. This movement of the actuating plungers 207 of the micro-switch devices 203 and 204 is effective to flex the respective contact of these devices from their closed to their open position thereby opening the power supply circuits to the above-mentioned three colored indicating lamps.

If, while the brakes are released, the loss of supply of electric power to the eight torque motors of the eight brake assemblies should occur in the manner described in the above-mentioned Patent No. 3,280,944, the respective spiral spring 56 of each one of the eight brake assemblies for the eight wheels of the two-truck car will effect, in the manner hereinbefore described, a full brake application on the corresponding wheel. Each one of the eight inoperative brake assemblies may be manually released in a manner which will now be described in detail.

Referring to FIG. 3 of the drawings, let it be supposed that the manual release lever 194 of each one of the eight brake assemblies on the two-truck car is located immediately beneath a corresponding small hinged trap door (not shown) in the floor of the car, which door may be manually opened when it is desired to effect a manual release of the corresponding brake assembly. To effect a manual release of each inoperative brake assembly, subsequent to opening the corresponding trap door, a trainman within the car will first insert through the open trap door a long bar having a hook on its lower end and a T-shaped handle on its upper end.

Next, the trainman will introduce the hook on the lower end of the bar into the bore 200 in the arm 199 of the manual release lever 194 of the respective brake assembly.

Thereafter, the trainman will exert an upward pull on the T-handle of the bar to thereby effect clockwise rocking, as viewed in FIG. 3, of the manual release lever 194 about the headed pin 197.

As the manual release lever 194 is rocked clockwise, as viewed in FIG. 3, the corresponding depending arm 192 (FIGS. 2, 3 and 7) which is integral therewith, is effective, through the intermediary of the corresponding pin 190 and the link 188 integral therewith, and the pin 189, to move the corresponding locking rod 181 (FIG. 3) in an upward direction, it being understood that the pin 190 slides along the inclined surface 191 (FIGS. 2, 3 and 7) of depending arm 192 and the link 188 is rocked counterclockwise about its left-hand end, which end slides along the top surface of the top wall 12 of the main casing section 5 as the manual release lever 194 is rocked clockwise about the headed pin 197. The upward movement thus imparted to the locking rod 181 moves the lower end (FIG. 3) thereof upward and out of the corresponding notch or indentation 180 in the spring barrel 24.

As the locking rod 181 of the brake assembly is thus lifted upward so that the lower end thereof is moved out of locking engagement with the corresponding spring barrel 24, the spiral spring 56 that has its outer end anchored to this spring barrel is rendered effective to drive or rotate the spring barrel 24 and annular internal gear 25 secured thereto by the screws 26 in a counterclockwise direction, as viewed in FIG. 3, until the spiral spring 56 is completely unwound and the stored energy therein released, thus effecting a complete release of the braking force pressing the brake shoe 2 of the brake assembly against the tread surface of the corresponding wheel 113.

As the spring barrel 24 and corresponding annular internal gear 25 are thus rotated counterclockwise, as viewed in FIG. 3, by the corresponding spiral spring 56, the annular internal gear 25 is effective to rotate the three gears 27 counterclockwise without effecting rotation of the spring arbor, and this counterclockwise rotation of the three gears 27 in turn effects clockwise rotation of the sun gear 34, the armature shaft and the armature of the torque motor 31, but since no current is being supplied to the torque motor as a result of the power failure, this rotation of the armature is without effect.

The above-mentioned upward movement of the locking rod 181 is limited by the arm or pin 190, as it slides along the inclined surface 191 (FIG. 7) on the depending arm 192 of the manual release lever 194, falling into or being received in a semicircular groove 222 formed in the depending arm 192 at the lower end of the inclined surface 191 thereon. Therefore, upon the pin 190 being received in the corresponding groove 222, the corresponding manual release lever 194 is prevented from being further rocked in a clockwise direction, as viewed in FIG. 3, in response to the upward pull applied thereto by the trainman via the hook on the lower end of the bar. It should be understood that the lower end of the locking rod 181 has been lifted up far enough to release the spring barrel 24 prior to the pin 190 being received in the semicircular groove 222.

When a manual brake release of the brake assembly is effected by lifting the locking rod 181 upward, the collar 186 (FIGS. 3 and 6) secured to the locking rod 181 by the pin 187 is likewise moved upward. As the collar 186 is thus moved upward, the spring 219 (FIG. 6) is rendered effective to rock the lever 217 counterclockwise, as viewed in FIG. 6, about the screw 218 in order to maintain the upper end of the lever 217 in contact with the cone-shaped head formed on the lower end (as viewed in FIG. 3) of the collar 186. As the lever 217 is thus rocked counterclockwise, as viewed in FIG. 6, the lower portion of the lever 217 is effective to move the contact actuating plunger 207 of the micro-switch device 205 in the direction of the right hand to flex or bend the contact of this micro-switch device and thereby move this contact from a first position to a second position, it being understood that this contact operates in the same manner as described in detail in the hereinbefore-mentioned Patent 3,280,944 for the contact 160 of the micro-switch device 159 shown in this patent, to establish a power supply "stick circuit" to the colored indicating lamps located on each side of the back end of the car.

From the foregoing, it will be understood that upon effecting a manual release of each of the eight brake assemblies on the two-truck car, subsequent to a spring-applied brake application occurring as a result of a failure of the electrical power supply to the eight torque motors 31 associated respectively with the eight brake assemblies provided for the eight wheels of the two-truck car, the colored indicating lamp located inside of the car will be extinguished to apprise the engineer of the fact that the brakes on the car have been manually released, and a "stick circuit" will be established for the two colored indicating lamps located on the opposite sides of the back end of the car so that these lamps remain lit subsequent to effecting the manual release of the brakes on the car. By establishing a "stick circuit" so that the indicating lamps on the opposite sides of the back end of the car remain lit, subsequent to effecting a manual release of the brakes, the engineer of a train approaching the back end of the car at night or during a fog would be notified of the presence of the car prior to colliding with it.

Subsequent to making the necessary repairs required to restore the electrical power supply to the eight torque motors 31, let it be supposed that it is desired that the eight brake assemblies on the car be conditioned so that the car can be again placed in revenue service.

First, electrical current will be resupplied to the eight torque motors 31 to cause the torque output of these motors to increase to its maximum value. Consequently, each torque motor 31 will, through its armature shaft, rotate the corresponding sun gear 34 counterclockwise, as viewed in FIG. 3. Since the spring barrel 24 is now unlocked, the three gears 27 act like spokes in a wheel of which the sun gear 34 is the hub and the annular internal gear 25 is the rim. Therefore, the counterclockwise rotation of the sun gear 34 by the torque motor 31 causes the annular internal gear 25 and the spring barrel 24 to rotate counterclockwise. Since the outer end of the spiral spring 56 is anchored to the spring barrel 24 and the inner end of this spring is anchored to the hub 30 of the spring arbor, the above-mentioned counterclockwise rotation of the spring barrel 24 transmits a force or thrust through the unwound spiral spring 56 to the hub 30 which is effective to cause the spring arbor to rotate counterclockwise, as viewed in FIG. 3. Since the key 39 (FIG. 2) operatively connects the hub 30 of the spring arbor to the portion of reduced diameter 37 at the right-hand end of the screw 35, this counterclockwise rotation of the spring arbor and its hub 30 effects rotation of the screw 35 therewith to cause the traveling nut 59 to travel along the screw 35 in the direction of the left hand to rock the brake lever 82 to its brake release position in which the two ball nut spring seats 72 carried by the ball nut trunnion 78 abut the left-hand wall of the main casing section 5.

After the two ball nut spring seats 72 abut the left-hand wall of the main casing section 5, the screw 35 and the spring arbor are prevented from rotating. Since the three shafts 29 are carried by the spring arbor, these shafts are stationary upon cessation of rotation of the spring arbor. Therefore, as the sun gear 34 continues to be rotated counterclockwise by the torque motor 31, this counterclockwise rotation of the sun gear 34 now causes clockwise rotation of the three gears 27 which in turn drive the internal gear 25 and the spring barrel 24 clockwise, as viewed in FIG. 3. Since the inner end of the spiral spring 56 is anchored to the now stationary hub 30 of the spring arbor and the outer end of this spring is anchored to the spring barrel 24, which is now rotating in a clockwise direction, as viewed in FIG. 3, the spiral spring 56 will be completely wound up, it being understood that the torque motor 31 is stalled when the spiral spring 56 is completely wound up.

Subsequent to the complete windup of the spiral springs 56 of the eight brake assemblies on the two-truck car, a trainman from within the car will lock the spring barrel 24 of each brake assembly in the following manner.

Subsequent to opening the trap door above the respective brake assembly, the trainman will first insert through the open trap door the hereinbefore-mentioned bar.

Next, the trainman will introduce the hook on the lower end of the bar into the bore 200 in the arm 199 of the manual release lever 194 of the respective brake assembly.

After the hook on the lower end of the bar has been introduced into the bore 200 in the arm 199, the trainman will exert a downward thrust on the T-handle of the bar to transmit a force through the bar to the arm 199, which force acts in the direction to effect counterclockwise rocking, as viewed in FIG. 3, of the manual release lever 194 about the headed pin 197. Since the arms 199 and 192 are both integral with the manual release lever 194, it will be apparent that as the manual release lever 194 is rocked counterclockwise by the trainman via the bar and hook, the arm 190 rides up out of the semicircular groove 222 in the depending arm 192 and slides along the surface 191 on the depending arm 192 which is being rotated counterclockwise. As the arm 190 thus slides along the surface 191, the spring 185 (FIG. 3) is rendered effective to move the locking rod 181 downward until the lower end thereof abuts the bottom of an indentation 180 in the spring barrel 24, since the upper end of the locking rod 181 is pivotally connected by the pin 189 to the link 188 that is integral with the arm 190.

The trainman may now disengage the hook on the lower end of the bar from the bore 200 in the arm 199 of the manual release lever 194 and subsequently withdraw the bar upward through the trap door which is thereafter closed.

It will be understood that if an indentation 180 in the periphery of a spring barrel 24 is not in alignment with the corresponding locking rod 181 when this locking rod is manually moved downward by the trainman in the manner described above, the spring barrels can be rotated until alignment is obtained by decreasing the electric current supplied to the torque motors 31, in the manner explained in detail in the above-mentioned Patent 3,280,-944. When alignment between each locking rod 181 and an indentation 180 in the periphery of the corresponding spring barrel 24 is obtained, the corresponding spring 185 will force the lower end of the locking rod 181 into the indentation 180 that is in alignment therewith to thereby lock the respective spring barrel 24 against rotation. All of the spiral springs 56 of the eight brake assemblies of the two-truck car are now wound up and their corresponding spring barrels 24 locked against rotation. Consequently, the two-truck car is ready for revenue service since a brake application can now be effected in the manner hereinbefore described.

DESCRIPTION—FIGS. 8 TO 10

In FIGS. 8, 9 and 10 of the drawings, there is shown a portion of a brake assembly constructed in accordance with a second embodiment of the invention. According to this second embodiment of the invention, which differs from the first embodiment only in the construction of the clutch mechanism of the slack adjuster mechanism, the link members of this clutch mechanism are pivoted to only one of the two C-shaped clutch members that are moved into and out of clutching contact with the drum element that is keyed to the adjusting screw which carries thereon the longitudinally movable brake lever fulcrum member. Accordingly, like reference numerals have been used to designate the structure shown in FIGS. 8, 9 and 10, which is identical to that shown in FIGS. 1 to 7, inclusive. Only such features of the structure and operation of the embodiment of the invention shown in FIGS. 8, 9 and 10 which differ from that of the embodiment of FIGS. 1 to 7, inclusive, will be hereinafter described.

According to the embodiment of the invention disclosed in FIGS. 8, 9 and 10, the spur gear 149, as in the first embodiment of the invention, carries on one side thereof the two identical pins 150 which are arcuately arranged 180° apart and on opposite sides and adjacent the opposite ends of a pair of identical U-shaped link members 223 and 224, the center lines of which link members lie in a straight line, as shown in FIG. 8.

The legs, which are tapered on one side, of the U-shaped link member 223 are disposed in grooves 225, one of which appears in FIGS. 8 and 10 of the drawings, formed in the opposite sides of a first substantially C-shaped clutch member 226 and on opposite sides of a tongue 227 formed at the upper end of a second substantially C-shaped clutch member 228 which is identical in construction to the clutch member 226. The U-shaped link member 223 is operatively connected to the tongue 227 of the C-shaped clutch member 228 by means such as, for example, a pin 229 that has a press fit in a bore 230 (FIG. 9) in the tongue 227 and a turning fit in a coaxial bore 231 that extends through the two spaced-apart legs of the U-shaped link member 223.

The lower end of the tapered side of each leg of the U-shaped link member 223 (FIG. 10) is cut off, as by a machining operation, to form a short flat surface 232 which is vertical while the U-shaped link member 223 occupies the position in which it is shown in FIG. 10.

Likewise, the lower end of the right-hand side of each leg of the U-shaped link member 223 is cut off, as by a machining operation, to form a short flat surface 233 which, while the U-shaped link member 223 occupies the position in which it is shown in FIG. 10, is inclined to the horizontal at an angle of substantially 45°. The purpose of forming the short flat side 233 on the link member 223 is to facilitate assembly, since the legs of link members 223 otherwise could not be shoved down through the grooves 225 in the opposite sides of the C-shaped clutch member 226 to the position shown in FIG. 10, in which position the short flat surface 232 on the left-hand side of each leg of the C-shaped link member 223 is disposed in a semicircular recess 234 formed in the C-shaped clutch member 226. As shown in FIG. 10, the left-hand end of the semicircular recess 234 terminates at one end of a flat surface 235. The opposite end of the flat surface 225 terminates at one end of a second semicircular recess 236 formed in the C-shaped clutch member 226 and forms therewith an edge 237 which, while the U-shaped link member 223 occupies the position shown in FIG. 10, abuts the tapered left-hand side of each leg of this link member.

The right-hand end of the semicircular recess 234, as shown in FIG. 10, is joined by an arcuate surface 238 of small radius to a flat surface 239 formed on the finger 172 that is integral with the C-shaped clutch member 226 and corresponds to the finger 172 in the first embodiment of the invention in that it is provided with a flat surface 171. This flat surface 171 is biased against the peripheral surface if the drum element 163 by the spring 167 (FIG. 8), one end of which surrounds a boss 240 formed on an elbow-like arm 241 that is integral with and at the upper end of the C-shaped clutch member 226, and the other end of which is disposed in a recess or spring pocket 242 formed in the upper portion of the C-shaped clutch member 228 adjacent the tongue 227.

The spring 167 also serves to bias the C-shaped clutch members 226 and 228 in opposite directions so that the edge 237 formed on the C-shaped clutch element 226 is biased against the tapered left-hand side of the legs of the U-shaped link member 223 at a point adjacent the lower end of these tapered sides, and the arcuate surface 238 formed on this clutch element 226 is biased against the bottom or end of each leg of the U-shaped link member 223 which is pivotally mounted on the tongue 227 of the C-shaped clutch member 228 by means of the pin 229, as hereinbefore explained.

The legs of the U-shaped link member 224 are operatively connected to the C-shaped clutch member 226 in the same manner as the legs of the U-shaped link member 223 are connected to the identical but opopsitely arranged C-shaped clutch member 228. Consequently, the pin shown in FIG. 8 for effecting this connection is denoted by the reference numeral 229.

As in the first embodiment of the invention, the oppositely arranged, substantially C-shaped clutch members 226 and 228 are, as shown in FIG. 8, each normally biased into gripping contact with the periphery of the drum element 163 at two points of contact that are spaced arcuately 90° apart by the two identical springs 167 and 168.

As hereinbefore explained, the spring 167 is interposed between the arm 241 of the C-shaped clutch member 226 and the spring pocket 242 formed in the upper portion of the C-shaped clutch member 228. Likewise, one end of the spring 168 surrounds a boss 243 formed on an elbow-like arm 244 that is integral with and at the lower end of the C-shaped clutch member 228, and the other end is disposed in a recess or spring pocket 245 formed in the lower portion of the C-shaped clutch member 226 adjacent the tongue 227 formed on the lower end of this clutch member, which tongue carries the pin 229 on which the U-shaped link member 224 is rockably mounted.

From the foregoing, it is apparent that the springs 167 and 168 are effective to bias the flat surfaces 171 and 176 formed on the C-shaped clutch member 226 and each at a right angle to the other, and the flat surfaces 173 and 175 formed on the C-shaped clutch member 228 and each at a right angle to the other, against the peripheral surface of the drum element 163 so that the drum element 163 is gripped at four points arcuately spaced 90° apart, whereby these clutch members 226 and 228 are effective, when rotated in a manner hereinafter described in detail, to correspondingly rotate the drum element 163 and the adjusting screw 91 connected thereto by the key 165, and thereby effect longitudinal movement of the fulcrum member 83 along the adjusting screw 91, as in the first embodiment of the invention.

OPERATION—FIGS. 8 TO 10

The operation of the brake assembly constituting the second embodiment of the invention is identical to the operation of the brake assembly shown in FIGS. 1 to 7, inclusive, except for the operation of the clutch mechanism of the slack adjuster mechanism which will now be described in detail.

As in the first embodiment of the invention, if no wear of the brake shoe 2 or the tread surface of the wheel 113 occurs while a brake application is in effect, the C-shaped clutch members 226 and 228 are not moved out of clutching contact with the peripheral surface of the drum element 153 and remain biased into clutching contact with this peripheral surface by the springs 167 and 168. Therefore, no rotation of the adjusting screw 91 is effected when releasing the brake application.

Let it now be supposed that a brake application has been effected in the manner hereinbefore described in connection with the first embodiment of the invention, and that appreciable wear of the brake shoe 2 or the tread surface of the wheel 113 occurs while the brake application is in effect.

Upon effecting the above-mentioned brake application and prior to the wearing away of the braking surface of the brake shoe 2 or the tread surface of the wheel 113, the rotation of the screw 35 effects, via the gear train including spur gears 114 and 120, and pinion 129, clockwise rotation, as viewed in FIG. 8, of the spur gear 149 and the pins 150 carried thereby from the position in which they are shown in FIG. 8 to a position in which the upper pin 150 contacts the tapered right-hand side of the U-shaped link member 224 and the lower pin 150 contacts the tapered left-hand side of the U-shaped link member 223.

Since the upper pin 150 contacts the tapered right-hand side of the U-shaped link member 224 and the lower pin 150 contacts the tapered left-hand side of the U-shaped link member 223 prior to wearing away of either the braking surface of the brake shoe 2 or the tread surface of the wheel 113, it will be apparent that as the braking surface of the brake shoe 2 or the tread surface of the wheel 113 wears away, the rotation of the screw 35 by the spiral spring 56 required to further rock the brake lever 82 in a counterclockwise direction in order to transmit in the manner hereinbefore described a braking force to the brake head 1 and brake shoe 2, also effects simultaneous clockwise rotation of gear 114 as viewed in FIG. 3, which in turn, via the gear train, causes further clockwise rotation, as viewed in FIG. 8, of the gear 149 and pins 150 from the hereinbefore-described position in which the upper pin 150 contacts the tapered right-hand side of the U-shaped link member 224 and the lower pin 150 contacts the tapered left-hand side of the U-shaped link member 223. As the gear 149 and the pins 150 carried thereby are further rotated in a clockwise direction, as viewed in FIG. 8, from the above-described position, the force exerted by the lower pin 150 against the tapered left-hand side of the U-shapd link member 223 (FIG. 10) is effective to rock this link member 223 clockwise about the pin 229. As the U-shaped link 223 is thus rocked clockwise about the pin 229, the tapered left-hand side of the legs of this link transmit a force via the edge 237 to the C-shaped clutch member 226, which force acts in the direction to cause counterclockwise rocking of the clutch member 226, as viewed in FIGS. 8 and 10, about the lower pin 229, shown in FIG. 8, against the yielding resistance of the spring 167, thereby tending to move the flat surfaces 171 and 176 formed on this clutch member 226 out of contact with the peripheral surface of the drum element 163 and thus reducing the force exerted by the spring 167 via this clutch member 226 on the drum element 163.

From the foregoing description of the clockwise rocking of the U-shaped link member 223 shown in FIGS. 8 and 10 by the lower pin 150 carried by the gear 149, it should be apparent that the upper pin 150 carried by this gear simultaneously effects clockwise rocking of the U-shaped link member 224 about the lower pin 229 to cause counterclockwise rocking of the C-shaped clutch member 228, as viewed in FIG. 8, about the upper pin 229, shown in FIG. 8, against the yielding resistance of the spring 168, thereby tending to move the flat surfaces 173 and 175 on the clutch member 228 out of contact with the peripheral surface of the drum element 163 and thus reduce the force exerted by the spring 168 via this clutch member 228 on the drum element 163.

When the forces exerted at the four points on the drum element 163 by the springs 167 and 168 via the clutch members 226 and 228 are reduced sufficiently, or, in other words, an amount to allow slippage between these clutch members and the drum element 163, these clutch members 226 and 228 will be rotated clockwise about the now stationary drum element 163 as the gear 149 and the pins 150 continue to be rotated clockwise, as viewed in FIG. 8, in response to the wearing away of the brake shoe 2 or the tread surface of the corresponding wheel 113 occurring while a brake application is in effect. Consequently, as in the first embodiment of the invention, it is apparent that as the braking surface of the brake shoe 2 or the tread surface of the corresponding wheel 113 wears away while a brake application is in effect, no rotation of the adjusting screw 91 is effected to cause the movable fulcrum member 83 to move along this adjusting screw.

When it is desired to effect a release of the brake application, the engineer will increase the torque output of each torque motor 31 to its maximum value whereupon the brakes will be released in the same manner as hereinbefore described in connection with the first embodiment of the invention.

As the brake application is thus released, the spur gear 149 and pins 150 are rotated counterclockwise, as viewed in FIGS. 8 and 10, to the position shown in FIG. 8.

As the spur gear 149 begins to rotate counterclockwise, as viewed in FIGS. 8 and 10, the pins 150 carried thereby are rotated therewith so that the lower pin 150 is moved away from the tapered left-hand side of the U-shaped link member 223 (FIGS. 8 and 10), and the upper pin 150 is moved away from the tapered right-hand side of the U-shaped link member 224 (FIG. 8). As the pins 150 are thus moved in the direction away from the link members 223 and 224, the springs 167 and 168 are rendered effective to, respectively, exert a force on the C-shaped clutch member 226 tending to rock it clockwise about the lower pin 229 so that the flat surfaces 171 and 176 on this clutch member 226 transmit a gripping force at two points to the peripheral surface of the drum element 163, and exert a force on the C-shaped clutch member 228 tending to rock it clockwise about the upper pin 229 so that the flat surfaces 173 and 175 on this clutch member 228 transmit a gripping force at two points to the peripheral surface of the drum element 163.

As the gear 149 and pins 150 carried thereby continue to be rotated counterclockwise toward the position in which they are shown in FIG. 8, and prior to reaching this position, the upper pin 150 will contact the right-hand side of the U-shaped link member 223 and the lower pin 150 will contact the left-hand side of the U-shaped link member 224, it being understood that these link members do not at this time occupy the position in which they are shown in FIG. 8.

As the gear 149 and pins 150 carried thereby continue to rotate counterclockwise toward the position shown in FIG. 8, the upper pin 150, shown in FIGS. 8 and 10, is effective to exert a force on the right-hand side of the U-shaped link member 223, which force acts in a direction to cause counterclockwise rocking of the U-shaped link member 223 about the upper pin 229. It will be apparent from FIG. 10 that the force transmitted by the upper pin 150 to the right-hand side of the U-shaped link member 223 is effective to cause the lower end of the legs of this link member to transmit a force to the arcuate surface 238 on the C-shaped clutch member 226, and that this force acts in a direction that tends to rock this clutch member clockwise about lower pin 229 (FIG. 8) so that the flat surfaces 171 and 176 on this clutch member 226 exert a gripping force on the peripheral surface of the drum element 163 at two points located arcuately 90° apart.

It will also be apparent from FIG. 10 that the distance from the center of the pin 229 to the intersection of a vertical line through the center of the pin 229 and a horizontal line through the center of the pin 150 is considerably greater, such as, for example, seven times, than the distance between the vertical line through the center of the pin 229 and a vertical line through the point of contact of the lower end of the front leg of the U-shaped link member 223 with the arcuate surface 238 on the C-shaped clutch member 226. Accordingly, the mechanical advantage provided by the construction shown in detail in FIG. 10 insures that the force pressing the two flat surfaces 171 and 176 formed on the C-shaped clutch member 226 against the peripheral surface of the drum element 163 greatly exceeds the force exerted by upper pin 150 on the right-hand side of the U-shaped link member 223.

From the foregoing, it is apparent that the lower pin 150 shown in FIG. 8 is effective to exert a force on the left-hand side of the U-shaped link member 224, which force is transmitted through this link member to the C-shaped clutch member 228 to press the flat surfaces 173 and 175 on this clutch member 228 against the peripheral surface of the drum element 163 with a gripping force that greatly exceeds the force exerted by the lower pin 150 on the left-hand side of the U-shaped link member 224.

Accordingly, it will be understood that the C-shaped clutch members 226 and 228 tightly grip the peripheral surface of the drum element 163 so that these clutch members, the drum element and the adjusting screw 91 are rotated counterclockwise, as viewed in FIG. 8, simultaneously with the gear 149 and pins 150 as the gear 149 and pins 150 carried thereby are rotated or returned to the position in which they are shown in FIG. 8, since the drum element 163 is keyed by the key 165 (FIG. 2) to the cylindrical end portion 166 of the adjusting screw 91. Since the fulcrum member 83 is restrained against rotation by the pins 84 (FIG. 5), as explained in connection with the first embodiment of the invention, the above-mentioned counterclockwise rotation of the adjusting screw 91 by the clutch mechanism of the slack adjuster mechanism of the brake assembly constituting the second embodiment of the invention is effective to cause the fulcrum member 83 to travel longitudinally along the adjusting screw 91 without rotation to move or shift the brake lever 82 simultaneously with its fulcrum member 83 to compensate for wear of the brake shoe 2 or the tread surface of the corresponding wheel 113 in the same manner as hereinbefore described in connection with the first embodiment of the invention.

Having now described the invention, what I claim as new and desire to secure by Letters Patent, is:

1. A brake assembly for a vehicle wheel comprising, in combination:
    (a) a casing,
    (b) a brake head having a brake shoe for applying a braking force to the vehicle wheel,
    (c) a brake lever,
    (d) link means pivotally connecting said brake head and said brake lever,
    (e) fulcrum means on which said brake lever is pivotally mounted,
    (f) power means carried by said casing and operatively connected to said lever for transmitting to the brake shoe a braking force active on the vehicle wheel, and
    (g) automatically operative slack adjuster means including:
        (i) a member rotatably mounted on said casing and supporting said fulcrum means for longitudinal movement thereon relative to said casing,
        (ii) means operated in consequence of the rocking of said brake lever through an angle greater than a chosen angle as a result of wear of the brake shoe carried by said brake head to effect rotation of said member, thereby to cause longitudinal movement of said fulcrum means therealong to regulate the location of said fulcrum means and brake lever carried thereby relative to said casing.

2. A brake assembly as claimed in claim 1, further characterized in that said fulcrum means is provided with internal screw threads, and in that said rotatable member is provided with external screw threads having screw-threaded engagement with said internal screw threads of said fulcrum means whereby rotation of said rotatable member causes movement of said fulcrum means and the brake lever pivotally mounted thereon relative to said casing.

3. A brake assembly for a vehicle wheel comprising, in combination:
    (a) a casing,
    (b) a brake head having a brake shoe for applying a braking force to the vehicle wheel,
    (c) a brake lever,
    (d) link means pivotally connecting one end of said brake lever to said brake head,
    (e) fulcrum means on which said brake lever is pivotally mounted intermediate its ends,
    (f) a screw member rotatably mounted on the casing for rotation in opposite directions on its longitudinal axis,
    (g) a traveling nut travelable on said screw member in opposite directions according to the direction of rotation of the screw-threaded member, said traveling nut being operatively connected to said brake lever whereby movement of said traveling nut along said screw member effects rocking of said lever,
    (h) power means carried by said casing for effecting rotation of said screw member to cause said traveling nut to travel therealong to rock said brake lever to apply a braking force to the brake shoe and release it therefrom, and
    (i) automatically operative slack adjuster means including:
        (i) a screw-threaded member rotatably mounted on said casing and on which said fulcrum means is supported in screw-threaded relation for longitudinal movement therealong in response to rotation of said screw-threaded member, and
        (ii) drive means driven by said screw member and automatically operative in consequence of the rocking of said brake lever through an angle greater than a chosen angle as a result of wear of the brake shoe carried by said brake head to effect rotation of said screw-threaded member on its longitudinal axis thereby to cause longitudinal movement of said fulcrum means therealong to regulate the location of said fulcrum means and brake lever pivotally mounted thereon relative to said casing.

4. A brake assembly as claimed in claim 3, further characterized in that said drive means includes a gear train driven by said screw member and a one-way clutch device operable via said gear train respectively out of and into clutching contact with said screw member accordingly as said screw member drives said gear train in one direction or in an opposite direction whereby said screw-threaded member is rotated on its longitudinal axis to cause longitudinal movement of said fulcrum means therealong only in response to said gear train being driven in said opposite direction by said screw member.

5. A brake assembly for a vehicle wheel comprising, in combination:
    (a) a brake head having a brake shoe for applying a braking force to the vehicle wheel,
    (b) a fulcrum member,
    (c) a brake lever pivotally mounted intermediate its ends on said fulcrum member and operably connected at one end to said brake head,
    (d) means for actuaing said brake lever including:
        (i) a screw member mounted for rotation in opposite directions on its longitudinal axis,
        (ii) spiral spring means connected to said screw member so as to be rotarily wound up upon rotation of said screw member in one direction and potentially effective when wound up to exert a force to rotate said screw member in the opposite direction,
        (iii) a traveling nut travelable on said screw member in opposite directions according to the direction of rotation of the screw member,
        (iv) means providing a connection between said pivoted lever and said traveling nut whereby movement of said traveling nut along said screw member in one direction effects rocking of said pivoted lever in its said one direction and vice versa,
        (v) power means for rotating said screw member in said one direction to cause travel of said traveling nut in a direction to rock said pivoted lever to release said brake shoe carried by said brake head and to maintain it in a release position and at the same time to cause windup of said spiral spring means, and
    (e) means for effecting slack adjusting movement of said fulcrum member including:
        (i) a screw-threaded member mounted for rotation on its longitudinal axis and on which said fulcrum member is supported in screw-threaded relation for movement therealong in response to rotation of said screw-threaded member,
        (ii) clutch means movable out of clutching contact with said screw-threaded member to enable said clutch means to be rotatable with respect to said screw-threaded member, said clutch means being also movable into clutching contact with said screw-threaded member whereby said clutch means and said screw-threaded member are simultaneously rotatable,
        (iii) drive means interposed between said screw member and said clutch means and driven by rotation of the screw member, and
        (iv) biasing means for normally biasing said clutch means into clutching contact with said screw-threaded member,
        (v) said drive means being operative in response to rotation of said screw member through more than a chosen number of revolutions in one direction occurring as a result of wear of the brake shoe carried by said brake head to first move said clutch means against the yielding resistance of said biasing means out of clutching contact with said screw-threaded member and thereafter rotate said clutch means with respect to said screw-threaded member,
        (vi) said drive means being also subsequently operative, in response to a reversal of direction of rotation of said screw member, to sequentially render said biasing means effective to bias said clutch means into clutching contact with said screw-threaded member, and thereafter, subsequent to rotation of said drive means through more than said chosen number of revolutions in said reversed direction of rotation, to effect rotation of said screw-threaded member via said clutch means thereby to cause movement of said fulcrum along said screw-threaded member to regulate the location of said fulcrum member and brake lever pivotally mounted thereon relative to said screw-threaded member.

6. A clutch device comprising, in combination:
    (a) a cylindrical rotary driven member mounted for rotation on its longitudinal axis,
    (b) a pair of identical but oppositely arranged clutch elements each having two angularly spaced flat surfaces for clutching contact with the periphery of said cylindrical rotary driven member,
    (c) biasing means carried by said clutch elements for normally biasing said clutch elements in opposite directions thereby to urge the flat surfaces on each clutch element into clutching contact with the periphery of said cylindrical rotary driven member, and
    (d) rotary drive means having a lost-motion connection with said pair of clutch elements whereby rotation of said drive means out of an original position in one direction through more than a chosen angle is effective to move said pair of clutch elements against the yielding resistance of said biasing means out of clutching contact with the periphery of said cylindrical rotary driven member and thereafter rotate said clutch elements in said one direction with respect to said driven member, said drive means being also subsequently operative, in response to a reversal or direction of rotation of said rotary drive means, to sequentially render said biasing means effective to bias said clutch elements into clutching contact with said cylindrical rotary driven member, and thereafter, subsequent to rotation of said drive means through more than said chosen angle in said reversed direction of rotation, to effect rotation of said cylindrical rotary driven member via said clutch elements.

7. A clutch device as claimed in claim 6, further characterized in that the two angularly spaced flat surfaces on each of said clutch elements form an angle of substantially 90° therebetween.

8. A clutch device as claimed in claim 6, further characterized in that said rotary drive means comprises link means pivotally connected to each of said clutch elements, said link means being operative in response to rotation of said rotary drive means out of an original position and through more than a chosen angle in one direction to effect movement of said oppositely arranged clutch elements out of clutching contact with the periphery of said cylindrical rotary driven member and thereafter rotate said clutch elements in said one direction with respect to said cylindrical rotary driven member, said link means being operative, subsequent to said biasing means moving said oppositely arranged clutch elements into clutching contact with the periphery of said cylindrical rotary driven member in response to a reversal of the direction of rotation of said rotary drive means, by said drive means after said drive means has rotated through said chosen angle in said reversed direction, to effect simultaneous rotation of said link means, said clutch elements and said cylindrical rotary driven member until said drive means is rotated in said reversed direction to its said original position.

9. A clutch device as claimed in claim 6, further characterized in that said biasing means comprises a pair of springs, and in that each of said oppositely arranged clutch elements is provided adjacent each end thereof with a spring seat, one of said springs being interposed between one spring seat adjacent one end of one clutch element and the other spring seat adjacent the other end of the oppositely disposed other clutch element, and the other of said springs being interposed between the other spring seat adjacent the other end of the one clutch element and the one spring seat adjacent the one end of the other clutch element.

10. A clutch device as claimed in claim 6, further characterized in that said rotary drive means comprises:
(a) a drive shaft, and
(b) a plurality of gears each having a line of contact with another of said gears, one of said gears being rigidly mounted on said drive shaft and another of said gears being rotatably mounted on said cylindrical rotary member, and in that the lost-motion connection between said rotary drive means and said pair of clutch elements comprises:
(a) a pair of radially extending links, each link being pivotally connected to each of said clutch elements, and
(b) a pair of diametrically spaced pins carried by said another of said gears, each pin being so disposed as to be movable into contact with a corresponding one of said links to effect rocking thereof in one direction subsequent to rotation of said another gear in one direction through more than a chosen angle whereby rocking of said links in said one direction effects movement of said clutch elements against the yielding resistance of said biasing means out of clutching contact with the periphery of said cylindrical rotary driven member,
(c) each of said pins being also sequentially operative, in response to a reversal of direction of rotation of said another gear, to move out of contact with said corresponding link to thereby render said biasing means effective to rock said links in the direction opposite said one direction to move the two flat surfaces on each of said clutch elements into clutching contact with the periphery of said cylindrical rotary driven member, and thereafter, subsequent to rotation of said another gear through said chosen angle in said reversed direction of rotation, to move into contact with the other of said links to, as said other gear continues to rotate in said reversed direction, rotate said links, said clutch elements and said cylindrical rotary driven member therewith.

11. A clutch device as claimed in claim 8, further characterized in that said link means includes a pair of U-shaped links each of which straddles the cooperating opposite ends of said oppositely arranged clutch elements.

12. A clutch device as claimed in claim 6, further characterized in that each of said oppositely arranged clutch elements at one end thereof is provided with an arm having at its remote end an elbow-like spring seat and adjacent the other end is provided with a second spring seat, and in that said biasing means comprises a pair of springs each of which is disposed between the elbow-like spring seat on the remote end of the arm of one clutch element and the corresponding second spring seat adjacent the other end of the other clutch element whereby said pair of springs is effective to normally bias the two flat surfaces on each respective clutch element into contact with the periphery of said cylindrical rotary driven element.

13. A clutch device as claimed in claim 6, further characterized in that said rotary drive means comprises a gear train having a gear ratio greater than one.

14. A clutch device as claimed in claim 6, further characterized in that said rotary drive means comprises a drive gear, and a driven gear rotatably mounted on said cylindrical rotary driven member for driving same in one direction through a lost-motion connection therewith, and in that a gear train is interposed between said drive gear and said driven gear.

15. A clutch device as claimed in claim 6, further characterized in that said rotary drive means comprises a pair of U-shaped link members one of which is pivotally mounted on one end of one of said clutch elements and the other of which is pivotally mounted on the corresponding end of the other of said clutch elements, and in that said pair of U-shaped link members is operative by said rotary drive means in response to rotation thereof out of an original position through more than a chosen angle in one direction to effect, through the intermediary of said pair of U-shaped link members, movement of said oppositely arranged clutch elements out of clutching contact with the periphery of said cylindrical rotary driven member and thereafter rotate said clutch elements in said one direction with respect to said cylindrical rotary driven member, said pair of U-shaped link members being operative, subsequent to said biasing means moving said oppositely arranged clutch elements into clutching contact with the periphery of said cylindrical rotary driven member in response to a reversal of the direction of rotation of said rotary drive means, by said drive means, after said drive means has rotated through said chosen angle in said reversed direction, to effect simultaneous rotation of said pair of U-shaped link members, said clutch elements, and said cylindrical rotary driven member until said rotary drive means is rotated in said reversed direction to its said original position.

16. A clutch device as claimed in claim 15, further characterized in that each of said U-shaped link members has a cam formed thereon which cooperates with the adjacent end of the other clutch element whereby the respective sequential rocking in opposite directions of each of the respective U-shaped link members by said rotary drive means in response to rotation thereof in said one direction and subsequently in said reversed direction effects sequential movement of said clutch elements out of and into clutching contact with said cylindrical rotary driven member.

17. A slack adjuster mechanism for a brake assembly of the type having a force-transmitting linkage through which force is transmitted to a brake-shoe-carrying brake head, the linkage including a brake lever pivotally mounted intermediate its ends on a fulcrum member, said slack adjuster mechanism comprising.
(a) a screw member mounted for rotation on its own longitudinal axis and having screw-threaded engagement with the fulcrum member for the brake lever of the brake assembly force-transmitting linkage,
(b) a drum element rigidly mounted on said screw member for rotation therewith,
(c) a pair of oppositely disposed clutch elements movable into and out of clutching contact with said drum element,
(d) a reversible gear train driven by the force-transmitting linkage of the brake assembly and comprising a plurality of gears,
(e) biasing means carried by said pair of oppositely disposed clutch elements for normally biasing said clutch elements into clutching contact with said drum element, and
(f) means operable by rotation in one direction of said plurality of gears through more than a chosen angle attained when the brake shoe carried by the brake head of the brake assembly wears away during a brake application for first moving said clutch elements against the yielding resistance of said biasing means out of clutching contact with said drum element and thereafter rotating said clutch elements with respect thereto, said means being subsequently operable by rotation in the opposite direction of said plurality of gears to their original position to sequentially render said biasing means effective to move said clutch elements into clutching contact with said drum element and thereafter, subsequent to rotation of said plurality of gears through more than said chosen angle, to effect rotation of said drum element and said screw member in said opposite direction to cause longitudinal movement of the fulcrum element therealong, thereby to change the position of the brake lever of the force-transmitting linkage relative to said screw member.

18. A slack adjuster mechanism for a brake assembly as claimed in claim 17, further characterized by a support member for said brake assembly and in that said screw member is rotatably mounted on the said support member for rotation on its longitudinal axis with respect thereto.

No references cited.

DUANE A. REGER, *Primary Examiner.*